(12) United States Patent
Yoshida

(10) Patent No.: US 11,052,717 B2
(45) Date of Patent: Jul. 6, 2021

(54) SUSPENSION SYSTEM

(71) Applicant: HITACHI AUTOMOTIVE SYSTEMS, LTD., Ibaraki (JP)

(72) Inventor: Yuki Yoshida, Atsugi (JP)

(73) Assignee: HITACHI ASTEMO LTD., Ibaraki (JP)

( * ) Notice: Subject to any disclaimer, the term of this patent is extended or adjusted under 35 U.S.C. 154(b) by 184 days.

(21) Appl. No.: 16/478,000

(22) PCT Filed: Jan. 26, 2018

(86) PCT No.: PCT/JP2018/002455
§ 371 (c)(1),
(2) Date: Jul. 15, 2019

(87) PCT Pub. No.: WO2018/139576
PCT Pub. Date: Aug. 2, 2018

(65) Prior Publication Data
US 2020/0079169 A1    Mar. 12, 2020

(30) Foreign Application Priority Data

Jan. 26, 2017   (JP) .............................. JP2017-012304

(51) Int. Cl.
*B60G 17/015*    (2006.01)
*B60G 17/052*    (2006.01)

(52) U.S. Cl.
CPC ......... *B60G 17/015* (2013.01); *B60G 17/052* (2013.01); *B60G 2202/152* (2013.01);
(Continued)

(58) Field of Classification Search
CPC ................................................. B60G 2400/50
See application file for complete search history.

(56) References Cited

U.S. PATENT DOCUMENTS

| 4,881,753 | A |   | 11/1989 | Shima et al. |
| 5,159,554 | A | * | 10/1992 | Buma ................ B60G 17/0155 280/5.513 |

(Continued)

FOREIGN PATENT DOCUMENTS

| JP | 61263816 | A | * | 11/1986 | ........... B60G 17/052 |
| JP | 10-119531 |   |   | 5/1998 | |

(Continued)

OTHER PUBLICATIONS

International Search Report dated Mar. 20, 2018 in International (PCT) Application No. PCT/JP2018/002455 with English translation.

(Continued)

*Primary Examiner* — Faye M Fleming
(74) *Attorney, Agent, or Firm* — Wenderoth, Lind & Ponack, L.L.P.

(57) ABSTRACT

The present invention provides a suspension system capable of adjusting a vehicle height in a short time. The suspension system includes a front wheel-side suspension and a rear wheel-side suspension each provided between a vehicle body and an axle and configured to adjust a vehicle height according to supply and discharge of hydraulic fluid, a pressurization device configured to pressurize the hydraulic fluid, and a first tank and a second tank configured to store therein the hydraulic fluid pressurized by the pressurization device. When the suspension system lowers the vehicle height by each of the front wheel-side suspension and the rear wheel-side suspension, any one of the front wheel-side suspension and the rear wheel-side suspension discharges the hydraulic fluid to the first tank, and the other of the front wheel-side suspension and the rear wheel-side suspension discharges the hydraulic fluid into the second tank by the pressurization device.

6 Claims, 12 Drawing Sheets

(52) U.S. Cl.
CPC .... *B60G 2400/252* (2013.01); *B60G 2400/50* (2013.01); *B60G 2500/30* (2013.01); *B60G 2600/26* (2013.01)

(56) References Cited

U.S. PATENT DOCUMENTS 10,286,747 B2 * 5/2019 Tanaka ................. B60G 17/019
10,449,820 B2 * 10/2019 Iyoda ..................... F04B 41/02

FOREIGN PATENT DOCUMENTS

| JP | 2881783 | 4/1999 |
| JP | 2002-87040 | 3/2002 |
| JP | 2015-168288 | 9/2015 |

OTHER PUBLICATIONS

Written Opinion of the International Searching Authority dated Mar. 20, 2018 in International (PCT) Application No. PCT/JP2018/002455 with English translation.

* cited by examiner

SUSPENSION SYSTEM

TECHNICAL FIELD

The present invention relates to a suspension system mounted on a vehicle, such as a four-wheeled automobile.

BACKGROUND ART

Some of vehicles such as four-wheeled automobiles are equipped with a suspension system for adjusting a vehicle height (for example, refer to PTL 1). The suspension system according to this kind of conventional technique includes a front wheel-side suspension and a rear wheel-side suspension each disposed between a wheel body and an axle and configured to adjust the vehicle height according to supply and discharge of hydraulic fluid, a pressurization device configured to pressurize the hydraulic fluid, and a tank configured to store the hydraulic fluid pressurized by this pressurization device.

CITATION LIST

Patent Literature

[PTL 1] Japanese Patent Application Public Disclosure No. 2015-168288

SUMMARY OF INVENTION

Technical Problem

Conventionally, the vehicles equipped with the suspension system have generally alternately raised the vehicle height on the front wheel side of the vehicle and raised the vehicle height on the rear wheel side of the vehicle according to weights on the front wheel side and the rear wheel side when raising the vehicle height.

Then, the suspension system like the example discussed in PTL 1 simultaneously raises the vehicle height on the front wheel side of the vehicle and raises the vehicle height on the rear wheel side of the vehicle by including two tanks. However, this suspension system has a problem of undesirably taking a long time to adjust the vehicle height when lowering the vehicle height, because alternately lowering the vehicle height on the front wheel side of the vehicle and lowering the vehicle height on the rear wheel side of the vehicle.

An object of the present invention is to provide a suspension system capable of adjusting the vehicle height in a short time.

Solution to Problem

According to one aspect of the present invention, a suspension system includes a front wheel-side suspension and a rear wheel-side suspension each provided between a vehicle body and an axle and configured to adjust a vehicle height according to supply and discharge of hydraulic fluid, a pressurization device configured to pressurize the hydraulic fluid, and a first tank and a second tank configured to store therein the hydraulic fluid pressurized by this pressurization device. When the suspension system lowers the vehicle height by each of the front wheel-side suspension and the rear wheel-side suspension, any one of the front wheel-side suspension and the rear wheel-side suspension discharges the hydraulic fluid to the first tank, and the other of the front wheel-side suspension and the rear wheel-side suspension discharges the hydraulic fluid into the second tank by the pressurization device.

According to the one aspect of the present invention, the vehicle height can be adjusted in a short time.

DESCRIPTION OF EMBODIMENTS

In the following description, suspension systems according to embodiments of the present invention will be described in detail with reference to the accompanying drawings, based on an example in which these suspension systems are applied to an air suspension system mounted on a vehicle such as a four-wheeled automobile.

Figure 1:
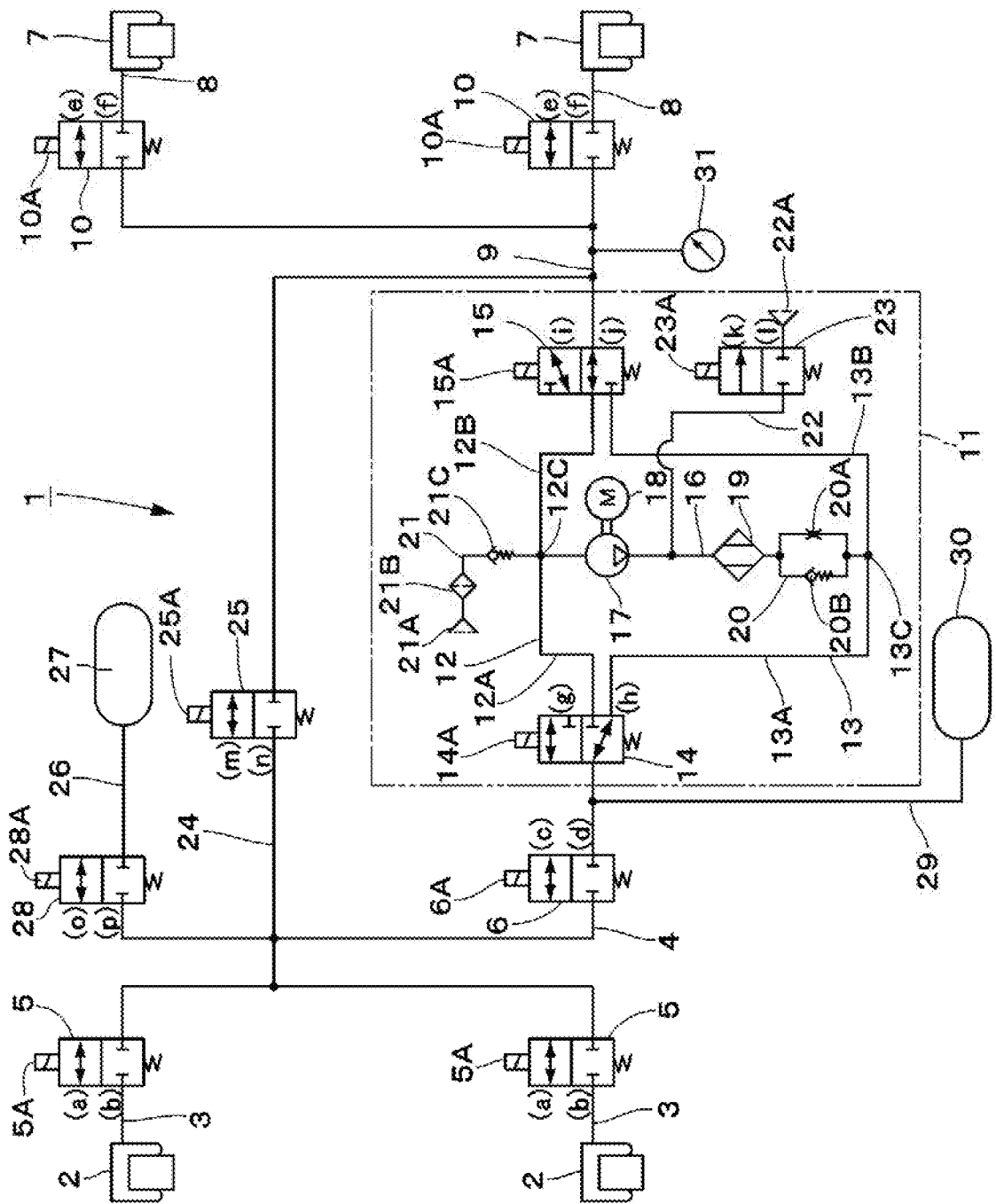
FIG. 1 is a circuit diagram illustrating a configuration of an entire air suspension system according to a first embodiment.

First, FIGS. 1 to 11 illustrate a first embodiment of the present invention. In FIG. 1, an air suspension system 1 intended to be mounted on a vehicle includes front wheel-side suspensions 2, rear wheel-side suspensions 7, a compression device 11, a first tank 27, a second tank 30, and a controller 33.

The front wheel-side suspensions 2 are disposed between a vehicle body side and an axle side of the vehicle (both are not illustrated) at positions on a front wheel side of the vehicle. More specifically, two front wheel-side suspensions 2 are provided in correspondence with left and right wheels on the front side, respectively. The front wheel-side suspensions 2 each function to adjust a vehicle height of the vehicle by, due to supply or discharge of compressed air as hydraulic fluid, being vertically extended or compressed according to a supplied or discharged amount of air (a compressed air amount) at this time. The front wheel-side suspensions 2 are connected to the compression device 11 via front-side branch conduits 3 and a front-side supply/discharge passage 4.

Now, one ends of the front-side branch conduits 3 are connected to the left and right front-side suspensions 2, respectively, and the other ends of the front-side branch conduits 3 are connected to the front-side supply/discharge passage 4. Front-side supply/discharge valves 5 are provided at intermediate positions of these front-side branch conduits 3.

Further, one end of the front-side supply/discharge passage 4 is connected to the front-side branch conduits 3, and the other end of the front-side supply/discharge passage 4 is connected to a first switching valve 14 of the compression device 11, which will be described below. A front-side switching valve 6 is provided at an intermediate position of the front-side supply/discharge passage 4.

The front-side supply/discharge valves 5 are provided in the individual front-side branch conduits 3 at positions between the front wheel-side suspensions 2 and the front-side switching valve 6, respectively. Each of these front-side supply/discharge valves 5 is constructed with use of a two-port two-position normally-closed electromagnetic valve equipped with a solenoid (coil) 5A, and switching thereof is controlled by the controller 33, which will be described below. The front-side supply/discharge valve 5 is selectively switched to an open position (a) and a closed position (b) due to power supply from the controller 33 to the solenoid 5A. At the open position (a), the front-side supply/discharge valve 5 opens each of the front-side branch conduits 3, thereby permitting supply and discharge of the compressed air to and from the front wheel-side suspension 2. At the closed position (b), the front-side supply/discharge valve 5 closes each of the front-side branch conduits 3, thereby blocking the supply and the discharge of the compressed air to and from the front-side suspension 2.

The front-side switching valve 6 is provided in the front-side supply/discharge passage 4 at a position between the front-side supply/discharge valves 5 and the compression device 11. This front-side switching valve 6 is constructed with use of a two-port two-position normally-closed electromagnetic valve equipped with a solenoid 6A, and switching thereof is controlled by the controller 33, which will be described below. The front-side switching valve 6 is selectively switched to an open position (c) and a closed position (d) due to power supply from the controller 33 to the solenoid 6A. At the open position (c), the front-side switching valve 6 opens the front-side supply/discharge passage 4, thereby permitting the supply and the discharge of the compressed air to and from the front wheel-side suspensions 2. At the closed position (d), the front-side switching valve 6 closes the front-side supply/discharge passage 4, thereby blocking the supply and the discharge of the compressed air to and from the front-side suspensions 2.

The rear wheel-side suspensions 7 are disposed between the vehicle body side and the axle side of the vehicle (both are not illustrated) at positions on a rear wheel side of the vehicle. More specifically, two rear wheel-side suspensions 7 are provided in correspondence with left and right wheels on the rear side, respectively. The rear wheel-side suspensions 7 each function to adjust the vehicle height of the vehicle by, due to supply or discharge of the compressed air, being vertically extended or compressed according to a supplied or discharged amount of the air (a compressed air amount) at this time. The rear wheel-side suspensions 7 are connected to the compression device 11 via rear-side branch conduits 8 and a rear-side supply/discharge passage 9.

Now, one ends of the rear-side branch conduits 8 are connected to the rear-side suspensions 7, respectively, and the other ends of the rear-side branch conduits 8 are connected to the rear-side supply/discharge passage 7. Rear-side supply/discharge valves 10 are provided at intermediate positions of these rear-side branch conduits 8.

Further, one end of the rear-side supply/discharge passage 9 is connected to a second switching valve 15 of the compressor 11, which will be described below, and the other end of the rear-side supply/discharge passage 9 is connected to the rear-side branch conduits 8. A pressure sensor 31, which will be described below, is provided at an intermediate position of the rear-side supply/discharge passage 9.

The rear-side supply/discharge valves 10 are provided in the individual rear-side branch conduits 8 at positions between the rear wheel-side suspensions 7 and the compression device 11, respectively. Each of these rear-side supply/discharge valves 10 is constructed with use of a two-port two-position normally-closed electromagnetic valve equipped with a solenoid 10A, and switching thereof is controlled by the controller 33, which will be described below. The rear-side supply/discharge valve 10 is selectively switched to an open position (e) and a closed position (f) due to power supply from the controller 33 to the solenoid 10A. At the open position (e), the rear-side supply/discharge valve 10 opens each of the rear-side branch conduits 8, thereby permitting supply and discharge of the compressed air to and from the rear wheel-side suspension 7. At the closed position (f), the rear-side supply/discharge valve 10 closes each of the rear-side branch conduits 8, thereby blocking the supply and the discharge of the compressed air to and from the rear wheel-side suspension 7.

The compression device 11 as a pressurization device is arranged between the front wheel-side suspensions 2 and the rear wheel-side suspensions 7. More specifically, one end of the compression device 11 (one end of the first switching valve 14) is connected to the front-side supply/discharge passage 4, and the other end of the compression device 11 (the other end of the second switching valve 15) is connected to the rear-side supply/discharge passage 9. As illustrated in FIG. 1 and the like, this compression device 11 includes first and second airflow conduits 12 and 13, the first and second switching valves 14 and 15, a main conduit 16, a compressor 17, an electric motor 18, an air drier 19, a speed control valve 20, an intake conduit 21, an exhaust conduit 22, and the like. This compression device 11 forms, for example, a pneumatic source that supplies the compressed air acquired by compressing air to the front wheel-side suspensions 2 and the rear wheel-side suspensions 7.

One end of the first airflow conduit 12 is connected to the first switching valve 14, and the other end of the first airflow conduit 12 is connected to the second switching valve 15. This first airflow conduit 12 is configured to be connected to an intake side of the compressor 17 via the main conduit 16, and also connect the front-side supply/discharge passage 4 and the rear-side supply/discharge passage 9 to each other therebetween. In this case, the first airflow conduit 12 includes a front-side first airflow conduit 12A and a rear-side first airflow conduit 12B. The front-side first airflow conduit 12A connects the first switching valve 14 and a connection point 12C with the main conduit 16, which will be described below, to each other therebetween. The rear-side first airflow conduit 12B connects the connection point 12C with the main conduit 16 and the second switching valve 15 to each other therebetween.

Figure 3:
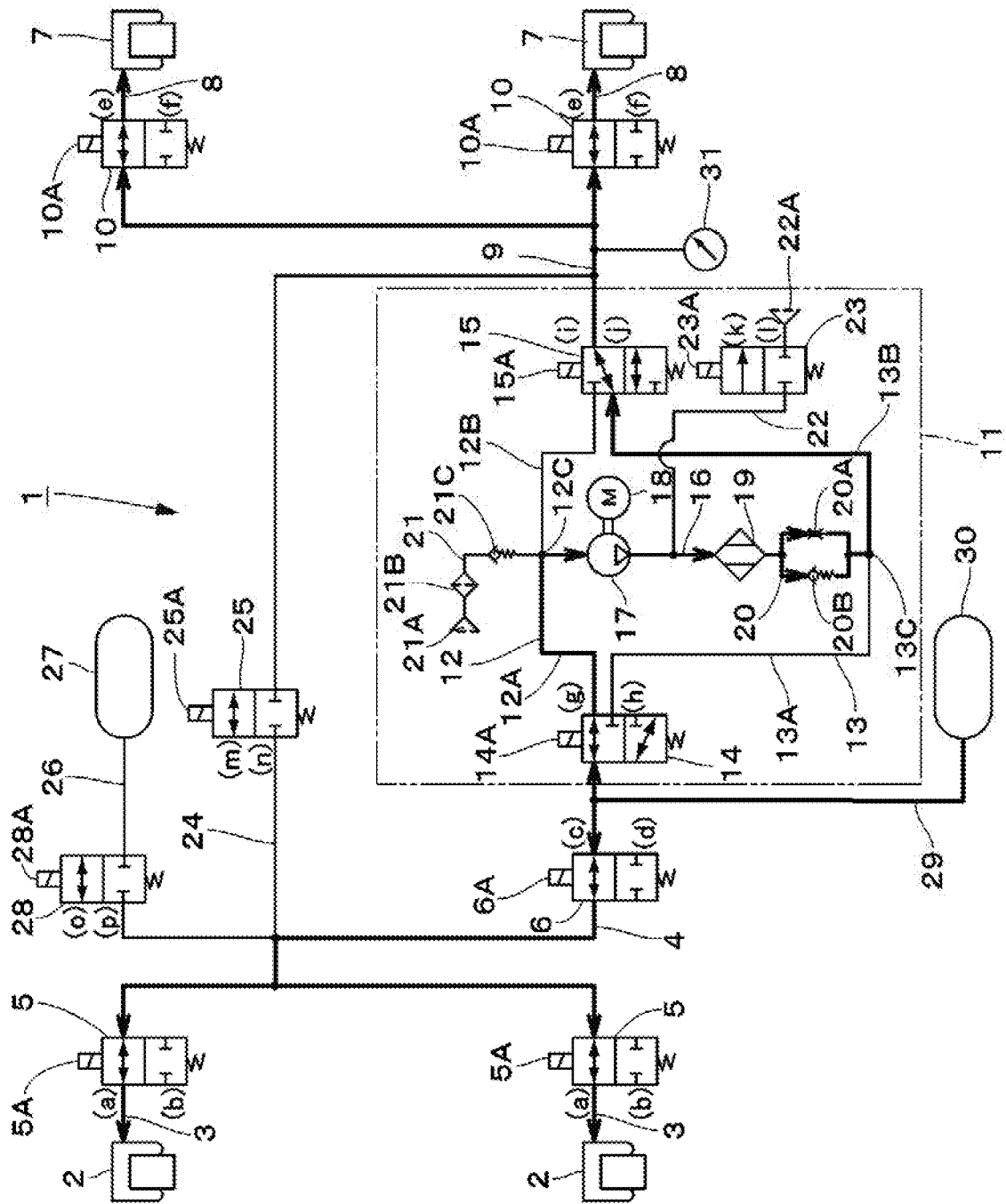
FIG. 3 is a circuit diagram illustrating a flow of hydraulic fluid when a vehicle height on a front wheel side and a vehicle height on a rear wheel side are raised at the same time.
Figure 4:
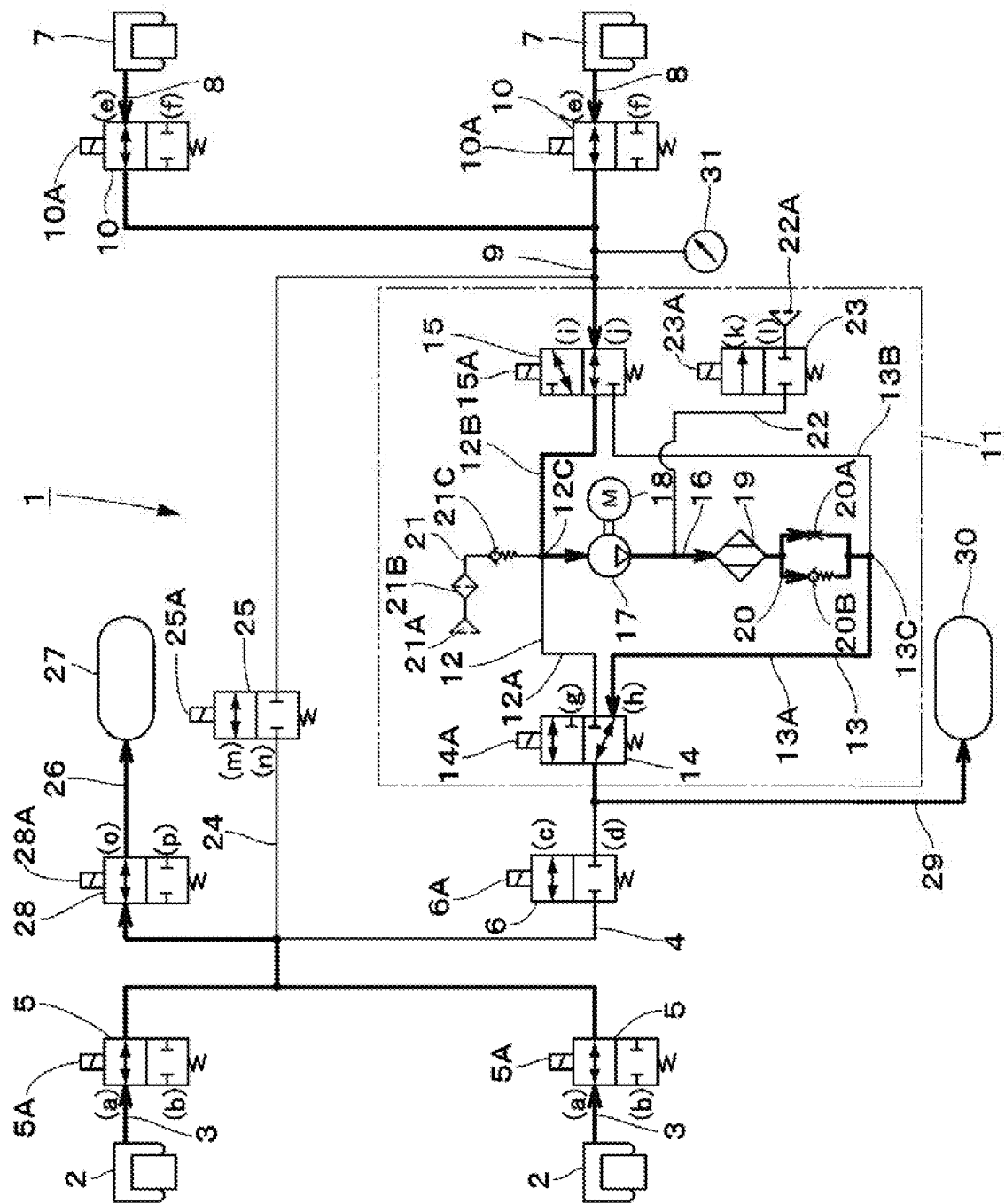
FIG. 4 is a circuit diagram illustrating a flow of the hydraulic fluid when the vehicle height on the front wheel side and the vehicle height on the rear wheel side are lowered at the same time.
Figure 6:
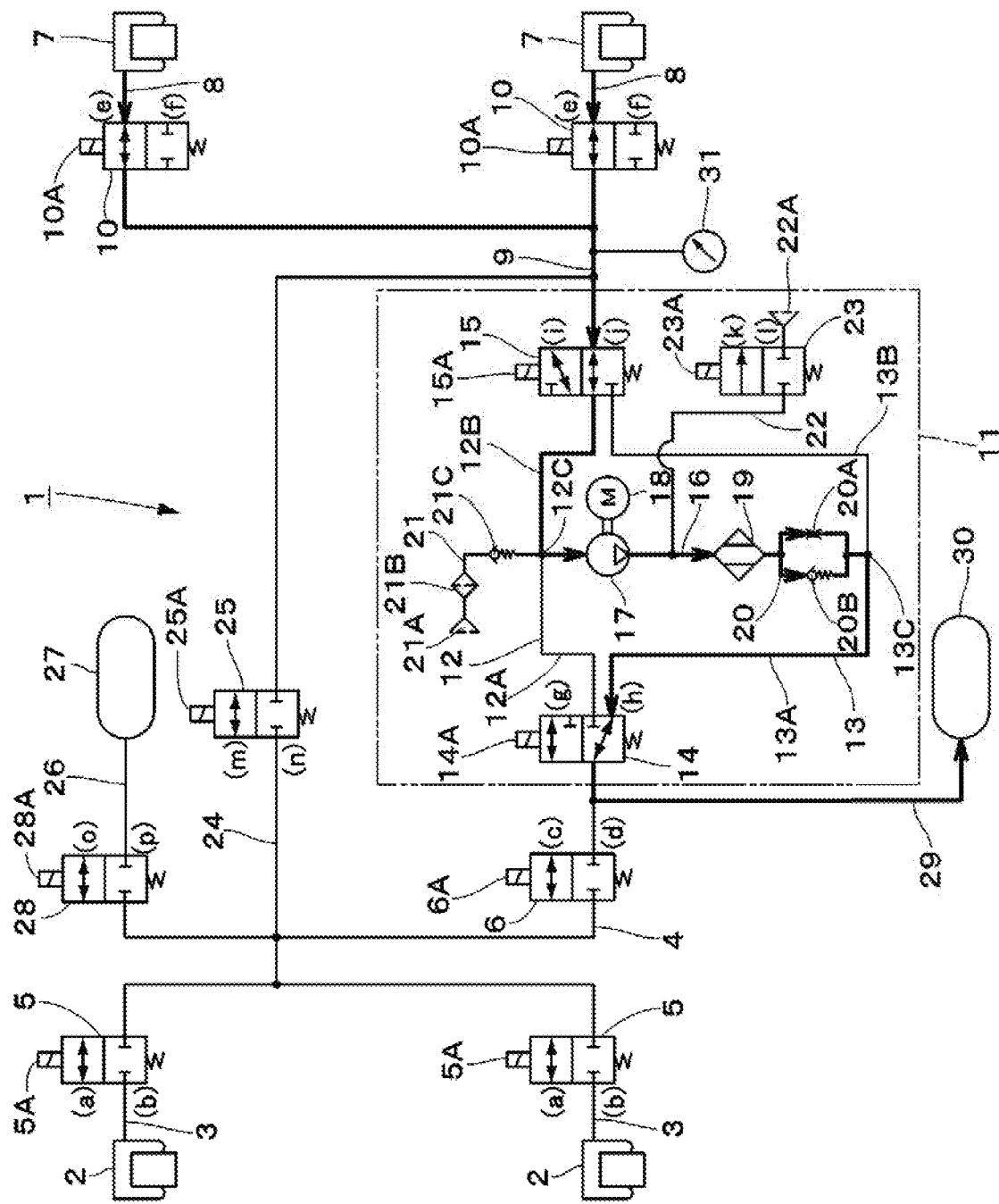
FIG. 6 is a circuit diagram illustrating a flow of the hydraulic fluid when the vehicle height on the rear wheel side is lowered.
Figure 8:
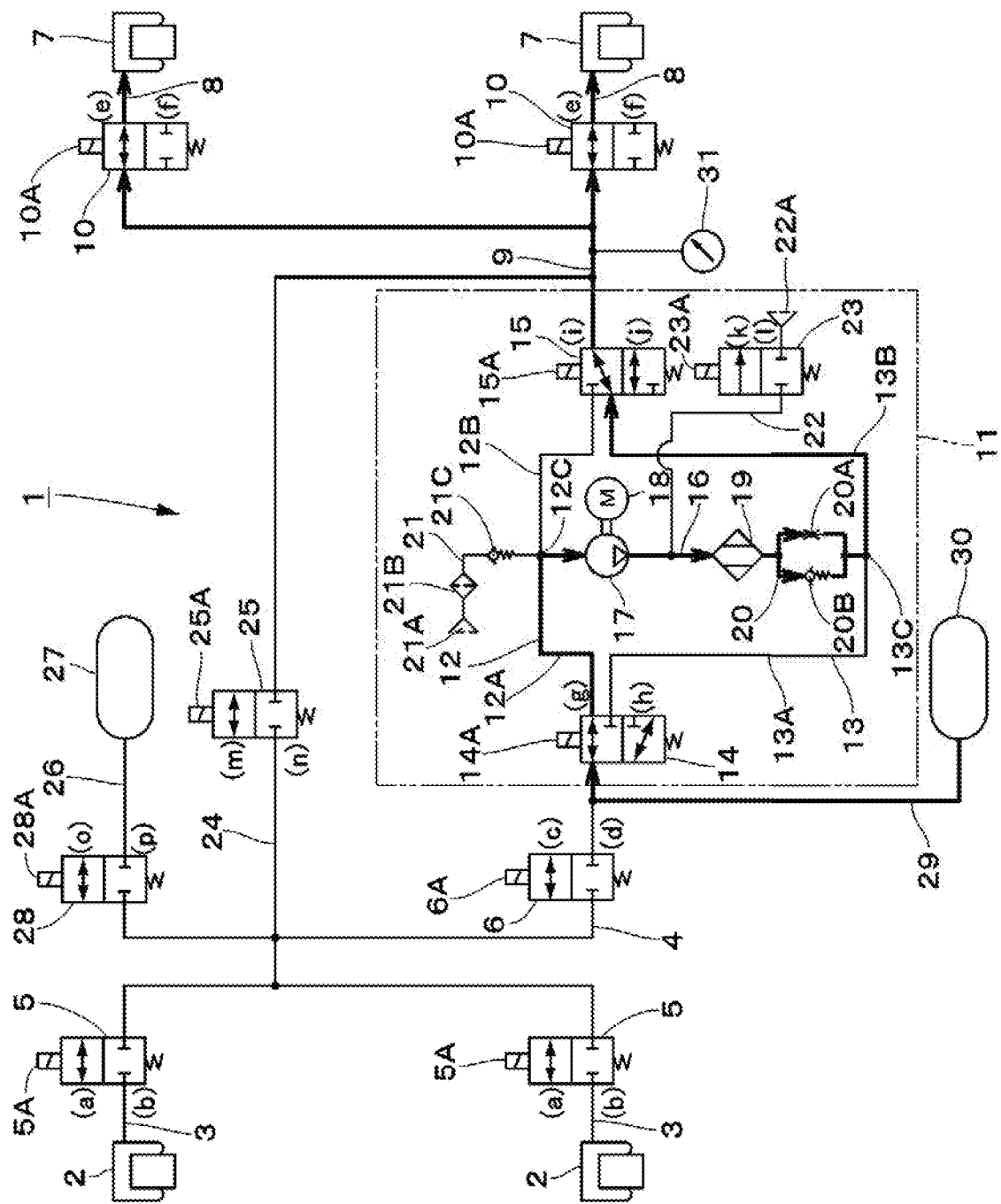
FIG. 8 is a circuit diagram illustrating a flow of the hydraulic fluid when the vehicle height on the rear wheel side is raised.

Then, one end of the front-side first airflow conduit 12A is connected to the first switching valve 14, which will be described below. As illustrated in FIGS. 3 and 8, this front-side first airflow conduit 12A forms an airflow passage that guides the compressed air in the second tank 30 to the intake side of the compressor 17 when communication is established between the rear wheel-side suspensions 7 and the compressor 17. Further, the other end of the rear-side first airflow conduit 12B is connected to the second switching valve 15, which will be described below. As illustrated in FIGS. 4 and 6, this rear-side first airflow conduit 12B forms an airflow passage that connects the rear wheel-side suspensions 7 to the intake side of the compressor 17 via the second switching valve 15 and the like.

On the other hand, one end of the second airflow conduit 13 is connected to the first switching valve 14, and the other end of the second airflow conduit 13 is connected to the second switching valve 15. This second airflow conduit 13 is configured to be connected to a discharge side of the compressor 17 via the main conduit 16, and also connect the first switching valve 14 and the second switching valve 15 to each other therebetween. In this case, the second airflow conduit 13 includes a front-side second airflow conduit 13A and a rear-side second airflow conduit 13B. The front-side second airflow conduit 13A connects the first switching valve 14 and a connection point 13C with the main conduit 16 to each other therebetween. The rear-side second airflow conduit 13B connects the connection point 13C with the main conduit 16 and the second switching valve 15 to each other therebetween.

The first switching valve 14 is provided at a position between the front-side switching valve 6 and the intake side or the discharge side of the compressor 17. In other words, the first switching valve 14 is connected to between the other end of the front-side supply/discharge passage 4 and the one end of the above-described first airflow conduit 12A or one end of the front-side second airflow conduit 13A. The first switching valve 14 is constructed with use of, for example, a three-port two-position electromagnetic directional control valve equipped with a solenoid 14A, and switching thereof is controlled by the controller 33, to selectively connect the front-side supply/discharge passage 4 to the intake side (the first airflow conduit 12) or the discharge side (the second airflow conduit 13) of the compressor 17.

Now, the first switching valve 14 is selectively switched to a power supply position (g) and a non-power supply position (h) due to power supply from the controller 33 to the solenoid 14A. At the power supply position (g), the first switching valve 14 permits the compressed air in the second tank 30 to be supplied to and discharged from the rear wheel-side suspensions 7 via the front-side first airflow conduit 12A and the main conduit 16. At the non-power supply position (h), the first switching valve 14 permits the compressed air in each of the suspensions 2 and 7 to be supplied (transmitted) into the second tank 30 via the main conduit 16 and the front-side second airflow conduit 13A. In other words, the first switching valve 14 is a switching valve that changes a direction in which the compressed air flows.

The second switching valve 15 is provided at a position between the rear-side supply/discharge valves 10 and the intake side or the discharge side of the compressor 17. In other words, the second switching valve 15 is connected to between the one end of the rear-side supply/discharge passage 9 and the other end of the rear-side first airflow conduit 12B or the other end of the rear-side second airflow conduit 13B. The second switching valve 15 is constructed with use of, for example, a three-port two-position electromagnetic directional control valve equipped with a solenoid 15A, and switching thereof is controlled by the controller 33, to selectively connect the first airflow conduit 12 or the second airflow conduit 13 to the rear-side supply/discharge passage 9.

Now, the second switching valve 15 is selectively switched to a power supply position (i) and a non-power supply position (j) due to power supply from the controller 33 to the solenoid 15A. At the power supply position (i), the second switching valve 15 permits the compressed air in the second tank 30 to be supplied to and discharged from the rear wheel-side suspensions 7 via the front-side first airflow conduit 12A, the main conduit 16, and the rear-side second airflow conduit 13B. At the non-power supply position (j), the second switching valve 15 permits the compressed air in each of the suspensions 2 and 7 to be supplied (transmitted) into the second tank 30 via the rear-side first airflow conduit 12B, the main conduit 16, and the front-side second airflow conduit 13A.

The main conduit 16 connects the first airflow conduit 12 and the second airflow conduit 13 to each other therebetween. More specifically, one end of the main conduit 16 on an upstream side is connected to the connection point 12C with the first airflow conduit 12 (between the front-side first airflow conduit 12A and the rear-side first airflow conduit 12B), and the other end of the main conduit 16 on a downstream side is connected to the connection point 13C with the second airflow conduit 13 (between the front-side second airflow conduit 13A and the rear-side second airflow conduit 13B). The main conduit 16 forms a supply/discharge conduit that supplies and discharges the compressed air to and from each of the suspensions 2 and 7. The compressor 17, the air drier 19, and the speed control valve 20 are provided in the main conduit 16.

The compressor 17 is positioned in the main conduit 16, and is constructed with use of, for example, a reciprocating compressor, a scroll-type compressor, or the like. The compressor 17 is drive by the electric motor 18 serving as a driving source, and generates the compressed air by compressing the air introduced from the first airflow conduit 12 side or the intake conduit 21 side to supply this compressed air toward the air drier 19.

The air drier 19 is provided between the compressor 17 and the speed control valve 20 at a position in the main conduit 16. This air drier 19 includes a moisture absorbent (not illustrated) and the like built therein, and absorbs moisture by the internal moisture absorbent when the compressed air supplied from the compressor 17 flows in a forward direction toward the speed control valve 20. Then, the air drier 19 supplies the dried compressed air (the dry air) toward each of the suspensions 2 and 7. On the other hand, the compressed air (an exhaust) flowing in a backward direction from each of the suspensions 2 and 7 or the second tank 30 toward the exhaust conduit 22, which will be described below, flows backward in the air drier 19, thereby capturing the moisture absorbed by the moisture absorbent and thus regenerating this moisture absorbent.

The speed control valve 20 is provided between the air drier 19 and the second airflow conduit 13 at a position in the main conduit 16. This speed control valve 20 is formed by a parallel circuit including an orifice 20A and a check valve 20B, and is configured in the following manner. With respect to the flow in the forward direction, the check valve 20B is opened and the compressed air is not subjected to a reduction in a flow rate. However, with respect to the flow in the backward direction, the check valve 20B is closed, and the compressed air at this time is subjected to the reduction in the flow rate due to the orifice 20A, thereby flowing backward slowly at a small flow rate inside the air drier 19.

The intake conduit 21 is provided at an upstream position of the intake side of the compressor 17. More specifically, one end of the intake conduit 21 is in communication with outside via an intake port 21A, and the other end of the intake conduit 21 is connected to the first airflow conduit 12. This intake conduit 21 functions to supply outside air or the atmosphere introduced from the intake port 21A due to actuation of the compressor 17 toward the compressor 17 via a filter 21B. A check valve 21C is provided in the intake conduit 21. The check valve 21C prevents a backward flow of the air introduced from the intake port 21A.

The exhaust conduit 22 is provided between the discharge side of the compressor 17 and the speed control valve 20. More specifically, one end of the discharge conduit 22 is connected to the main conduit 16, and the other end of the discharge conduit 22 is in communication with outside via an exhaust port 22A. This exhaust conduit 22 is a conduit for exhausting the compressed air in each of the suspensions 2 and 7 and the tanks 27 and 30 into the external atmosphere. An exhaust valve 23 is provided at an intermediate position of the exhaust conduit 22.

The exhaust valve 23 is a valve that establishes and blocks communication of the exhaust conduit 22 connected to the main conduit 16 with the atmosphere. This exhaust valve 23 is constructed with use of a two-port two-position normally-closed electromagnetic valve equipped with a solenoid 23A, and switching thereof is controlled by the controller 33. The exhaust valve 23 is selectively switched to an open position (k) and a closed position (l) due to power supply from the controller 33 to the solenoid 23A. At the open position (k), the exhaust valve 23 opens the exhaust conduit 22, thereby permitting the compressed air to be exhausted from the exhaust port 22A. At the closed position (l), the exhaust valve 23 closes the exhaust conduit 22, thereby prohibiting the compressed air from being exhausted from the exhaust port 22A. More specifically, the exhaust valve 23 is normally closed to block the communication of the exhaust conduit 22 with the exhaust port 22A. Then, when being opened, the exhaust valve 23 establishes the communication of the exhaust conduit 22 with the exhaust port 22A, thereby exhausting (releasing) the compressed air in the exhaust conduit 22 into the atmosphere.

A bypass conduit 24 is provided so as to bypass the compression device 11. More specifically, one end of the bypass conduit 24 is connected to the front-side supply/discharge passage 4, and the other end of the bypass conduit 24 is connected to the rear-side supply/discharge passage 9. This bypass conduit 24 functions to transmit the compressed air from the front-side supply/discharge passage 4 toward the rear-side supply/discharge passage 9 or from the rear-side supply/discharge passage 9 toward the front-side supply/discharge passage 4 while bypassing the compression device 11. A bypass valve 25 is provided at an intermediate position of the bypass conduit 24.

The bypass valve 25 is a valve that establishes and blocks communication through the bypass conduit 24. This exhaust valve 25 is constructed with use of a two-port two-position normally-closed electromagnetic valve equipped with a solenoid 25A, and switching thereof is controlled by the controller 33. The bypass valve 25 is selectively switched to an open position (m) and a closed position (n) due to power supply from the controller 33 to the solenoid 25A. At the open position (m), the bypass valve 25 opens the bypass conduit 24, thereby establishing the communication between the front-side supply/discharge passage 4 and the rear-side supply/discharge passage 9. At the closed position (n), the bypass valve 25 closes the bypass conduit 24, thereby blocking the communication between the front-side supply/discharge passage 4 and the rear-side supply/discharge passage 9.

A first tank conduit 26 is connected to an intermediate position of the front-side supply/discharge passage 4. More specifically, one end of the first tank conduit 26 is connected to a connection point between the front-side supply/discharge passage 4 and the bypass conduit 24, and the other end of the first tank conduit 26 is connected to the first tank 27.

The first tank 27 is a low-pressure tank that stores the compressed air pressurized over the atmospheric pressure by the compressor 17. The first tank 27 and the compressor 17 are connected to each other via the first tank conduit 26, the front-side supply/discharge passage 4, the front-side first airflow conduit 12A, the front-side second airflow conduit 13A, the main conduit 16, and the like. Due to this configuration, the compressed air supplied from the compressor 17 is stored into the first tank 27 via the main conduit 16, the front-side second airflow conduit 13A, the front-side supply/discharge passage 4, the first tank conduit 26, and the like.

In this case, the compressed air stored in the first tank 27 (i.e., the lower-pressure tank) is low in pressure therein compared to the compressed air stored in the second tank 30 (i.e., a high-pressure tank), which will be described below, and is set to, for example, a lower pressure (for example, 1 to 3 hPa) than the pneumatic pressure supplied into the suspensions 2 and 7. This first tank 27 is a low-pressure tank into which the compressed air in the front wheel-side suspensions 2 is discharged when the front wheel-side suspensions 2 lower the vehicle height on the front side. Now, if the pressure of the compressed air stored in the first tank 27 increases, this increase makes it impossible to discharge the compressed air in the front wheel-side suspensions 2 into the first tank 27. To prevent such inconvenience, the compressed air in the first tank 27 is transferred (supplied) into the second tank 30 via the first tank conduit 26, the bypass conduit 24, the rear-side supply/discharge passage 9, the rear-side first airflow conduit 12B, the main conduit 16, the front-side second airflow conduit 13A, the front-side supply/discharge passage 4, and a second tank conduit 29.

A first tank valve 28 is a valve that establishes and blocks the communication through the first tank conduit 26. This first tank valve 28 is constructed with use of a two-port two-position normally-closed electromagnetic valve equipped with a solenoid 28A, and switching thereof is controlled by the controller 33. The first tank valve 28 is selectively switched to an open position (o) and a closed position (p) due to power supply from the controller 33 to the solenoid 28A. At the open position (o), the first tank valve 28 opens the first tank conduit 26, thereby permitting supply and discharge of the compressed air to and from the first tank 27. At the closed position (p), the first tank valve 28 closes the first tank conduit 26, thereby blocking the supply and the discharge of the compressed air to and from the first tank 27.

The second tank conduit 29 is connected to an intermediate position of the front-side supply/discharge passage 4 at a position between the front-side switching valve 6 and the first switching valve 14. More specifically, one end of the second tank conduit 29 is connected to the front-side supply/ discharge passage 4, and the other end of the second tank conduit 29 is connected to the second tank 30.

The second tank 30 is a high-pressure tank that stores the compressed air pressurized over the atmospheric pressure by the compressor 17. The second tank 30 and the compressor 17 are connected to each other via the second tank conduit 29, the front-side supply/discharge passage 4, the front-side first airflow conduit 12A, the front-side second airflow conduit 13A, the main conduit 16, and the like. Due to this configuration, the compressed air supplied from the compressor 17 is stored into the second tank 30 via the main conduit 16, the front-side second airflow conduit 13A, the front-side supply/discharge passage 4, the second tank conduit 29, and the like.

In this case, the compressed air stored in the second tank 30 is high in pressure therein compared to the compressed air stored in the first tank 27, and is set to, for example, a higher pressure (for example, 10 to 15 hPa) than the pneumatic pressure supplied into the suspensions 2 and 7. Then, the compressed air stored in the second tank 30 is supplied to the front wheel-side suspensions 2 via the front-side supply/discharge passage 4 and the front-side branch conduits 3, and is supplied to the rear wheel-side suspensions 7 via the rear-side supply/discharge passage 9 and the rear-side branch conduits 8.

The pressure sensor 31 is connected to an intermediate position of the rear-side supply/discharge passage 9 at a position between the rear-side switching valves 10 and the second switching valve 15. This pressure sensor 31 detects pressures of the compressed air in each of the suspensions 2 and 7, the first tank 27, and the second tank 30 by detecting a pressure in the rear-side supply/discharge passage 9.

Figure 2:
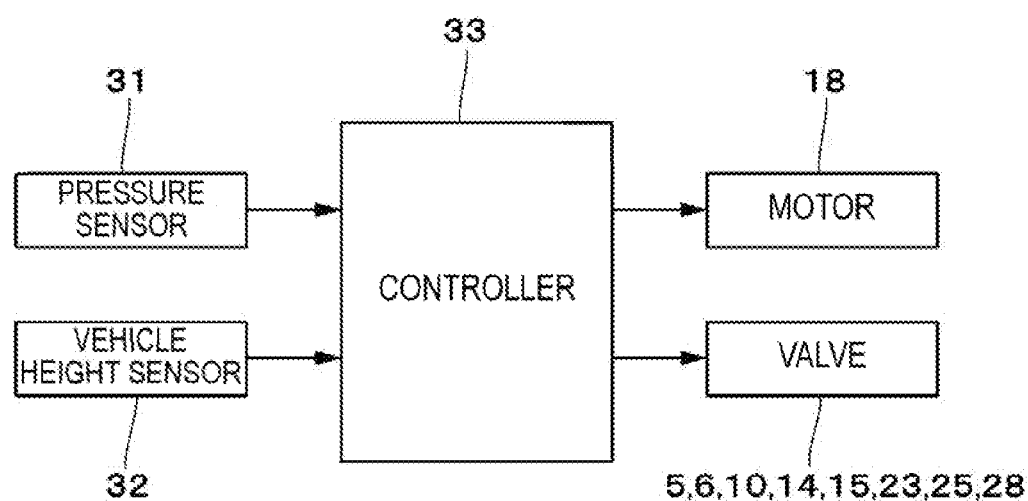
FIG. 2 is a block diagram illustrating a control device of the air suspension system according to the first embodiment.

A vehicle height sensor 32 as a vehicle height detector is provided to each of the suspensions 2 and 7 (refer to FIG. 2). This vehicle height sensor 32 detects a displacement in a direction in which each of the suspensions 2 and 7 is extended or compressed (a displacement in a vertical direction), and outputs a detection signal therefrom to the controller 33, which will be described below.

The controller 33 is formed by a microcomputer or the like as a control device that controls the supply and the discharge of the compressed air to and from each of the suspensions 2 and 7. As illustrated in FIG. 2, an input side of this controller 33 is connected to the pressure sensor 31, the vehicle height sensor 32, and the like, and an output side of the controller 33 is connected to the electric motor 18, the respective solenoids 5A, 6A, 10A, 14A, 15A, 23A, 25A, and 28A of the individual valves 5, 6, 10, 14, 15, 23, 25, and 28, and the like.

The controller 33 controls the driving and the stop of the electric motor 18, and controls the switching of each of the valves 5, 6, 10, 14, 15, 23, 25, and 28. In other words, the controller 33 adjusts front and rear vehicle heights of the vehicle by controlling each of the suspensions 2 and 7 as a vehicle height adjustment mechanism due to the control of each of the valves 5, 6, 10, 14, 15, 23, 25, and 28. The controller 33 controls the driving and the stop of the electric motor 18 based on the detection signals input from the pressure sensor 31, the vehicle height sensor 32, and the like, and also controls a current to be supplied to each of the valves 5, 6, 10, 14, 15, 23, 25, and 28 by, for example, changing a duty ratio of a PWM signal.

The air suspension system 1 according to the present embodiment is configured in the above-described manner, and an operation thereof will be described next.

First, when the compressed air is not sufficiently stored in the second tank 30 (i.e., the pressure in the second tank 30 is lower than a reference set pressure), the air suspension system 1 holds the first switching valve 14 and the second switching valve 15 at the non-power supply positions (h) and (j), respectively. Further, the air suspension system 1 holds the front-side supply/discharge valves 5, the front-side switching valve 6, the rear-side supply/discharge valves 10, the exhaust valve 23, the bypass valve 25, and the first tank valve 28 at the closed positions (b), (d), (f), (l), (n), and (p), respectively. Then, the air suspension system 1 actuates the compressor 17 (i.e., causes the compressor 17 to start the compression operation) by the electric motor 18.

Due to this operation, the compressor 17 introduces the external air into the compressor 17 via the intake port 21A, the filter 21B, and the check valve 21C of the intake conduit 21, and the main conduit 16, pressurizes (compresses or increases the pressure of) this air, and discharges the compressed air toward the air drier 19. The compressed air discharged from the compressor 17 is dried by the air drier 19, and, after that, is stored into the second tank 30 via the speed control valve 20, the front-side second airflow conduit 13A, the front-side supply/discharge passage 4, and the second tank conduit 29. Then, for example, when the pressure in the second tank 30 reaches the predetermined set pressure (for example, 10 to 15 hPa), the air suspension system 1 stops the compressor 17. Due to this operation, the air suspension system 1 can load and store a sufficient amount of the compressed air in the second tank 30.

Next, as illustrated in FIG. 3, when raising the vehicle height on the front wheel side and the vehicle height on the rear wheel side by each of the suspensions 2 and 7 at the same time, the air suspension system 1 switches the front-side supply/discharge valves 5 and the front-side switching valve 6 from the closed positions (b) and (d) to the open positions (a) and (c), respectively. Due to this switching, the air suspension system 1 establishes the communication between the front wheel-side suspensions 2 and the second tank 30, thereby supplying the compressed air in the second tank 30 toward the front wheel-side suspensions 2 via the front-side supply/discharge passage 4 and the front-side branch conduits 3.

On the other hand, the air suspension system 1 switches the rear-side supply/discharge valves 10 from the closed positions (f) to the open positions (e) and holds the first switching valve 14 and the second switching valve 15 at the power supply positions (g) and (i), respectively, thereby establishing the communication between the second tank 30 and the intake side of the compressor 17 and between the discharge side of the compressor 17 and the rear wheel-side suspensions 7. The air suspension system 1 actuates the compressor 17 in this state, thereby causing the compressed air in the second tank 30 to flow toward the intake side of the compressor 17 via the second tank conduit 29, the front-side supply/discharge passage 4, the front-side first airflow conduit 12A, and the main conduit 16. Then, the air suspension system 1 pressurizes the compressed air in the second tank 30 by the compressor 17 (the compression device 11), and supplies this compressed air toward the rear wheel-side suspensions 7 via the main conduit 16, the rear-side second airflow conduit 13B, the rear-side supply/discharge passage 9, and the rear-side branch conduits 8.

In this case, the air suspension system 1 separates the compressed air traveling from the second tank 30 toward the front wheel-side suspensions 2 and the compressed air traveling from the second tank 30 toward the rear wheel-side suspensions 7 from each other by the compressor 17. Due to this separation, the air suspension system 1 differentiates the pressure of the compressed air traveling toward the front wheel-side suspensions 2 and the pressure of the compressed air traveling toward the rear wheel-side suspensions 7 from each other, thereby preventing the pressures in the front wheel-side suspensions 2 and the pressures in the rear wheel-side suspensions 7 from affecting each other. More specifically, the compressed air traveling toward the rear wheel-side suspensions 7 is delivered via the compressor 17, and therefore is higher in pressure therein than the compressed air traveling toward the front wheel-side suspensions 2. When the front and rear vehicle heights will be raised at the same time, it is effective to set the pressure of the compressed air in the second tank 30 to a sufficiently high pressure in advance to prevent the compressor 17 from sucking the air from the front wheel-side suspensions 2.

After completing the operation of raising the vehicle heights, the air suspension system 1 switches the front-side supply/discharge valves 5 and the rear-side supply/discharge valves 10 to the closed positions (b) and (f), thereby closing the front-side branch conduits 3 and the rear-side branch conduits 8, respectively. Due to this operation, the air suspension system 1 can stop the flow of the compressed air to each of the suspensions 2 and 7, thereby keeping each of the suspensions 2 and 7 in the extended state and thus keeping the vehicle in the state having the raised vehicle height.

Next, as illustrated in FIG. 4, when lowering the vehicle height on the front wheel side and the vehicle height on the rear wheel side by each of the suspensions 2 and 7 at the same time, the air suspension system 1 switches the front-side supply/discharge valves 5 and the first tank valve 28 from the closed positions (b) and (p) to the open positions (a) and (o), respectively. Further, the air suspension system 1 holds the front-side switching valve 6 and the bypass valve 25 at the closed positions (d) and (n), respectively. Due to this operation, the air suspension system 1 can lower the vehicle height on the front wheel side by establishing the communication between the front wheel-side suspensions 2 and the first tank 27 to discharge the compressed air in the front wheel-side suspensions 2 to the first tank 27 to thus shift the front wheel-side suspensions 2 to the compressed state.

On the other hand, the air suspension system 1 switches the rear-side supply/discharge valves 10 from the closed positions (f) to the open positions (e) and holds the first switching valve 14 and the second switching valve 15 at the non-power supply positions (h) and (j), respectively, thereby establishing the communication between the intake side of the compressor 17 and the rear wheel-side suspensions 7 and also establishing the communication between the discharge side of the compressor 17 and the second tank 30. The air suspension system 1 actuates the compressor 17 in this state, thereby causing the compressed air in the rear wheel-side suspensions 7 to flow to the intake side of the compressor 17 via the rear-side branch conduits 8, the rear-side supply/discharge passage 9, the rear-side first airflow conduit 12B, and the main conduit 16. Then, the air suspension system 1 sucks the compressed air in the rear wheel-side suspensions 7 by the compressor 17 while supplying this compressed air toward the second tank 30 via the main conduit 16, the front-side second airflow conduit 13A, the front-side supply/discharge passage 4, and the second tank conduit 29. As a result, the air suspension system 1 discharges the compressed air from the rear wheel-side suspensions 7 to the second tank 30 by the compression device 11 to thus shift the rear wheel-side suspensions 7 to the compressed state, thereby being able to lower the vehicle height on the rear wheel side.

Figure 5:
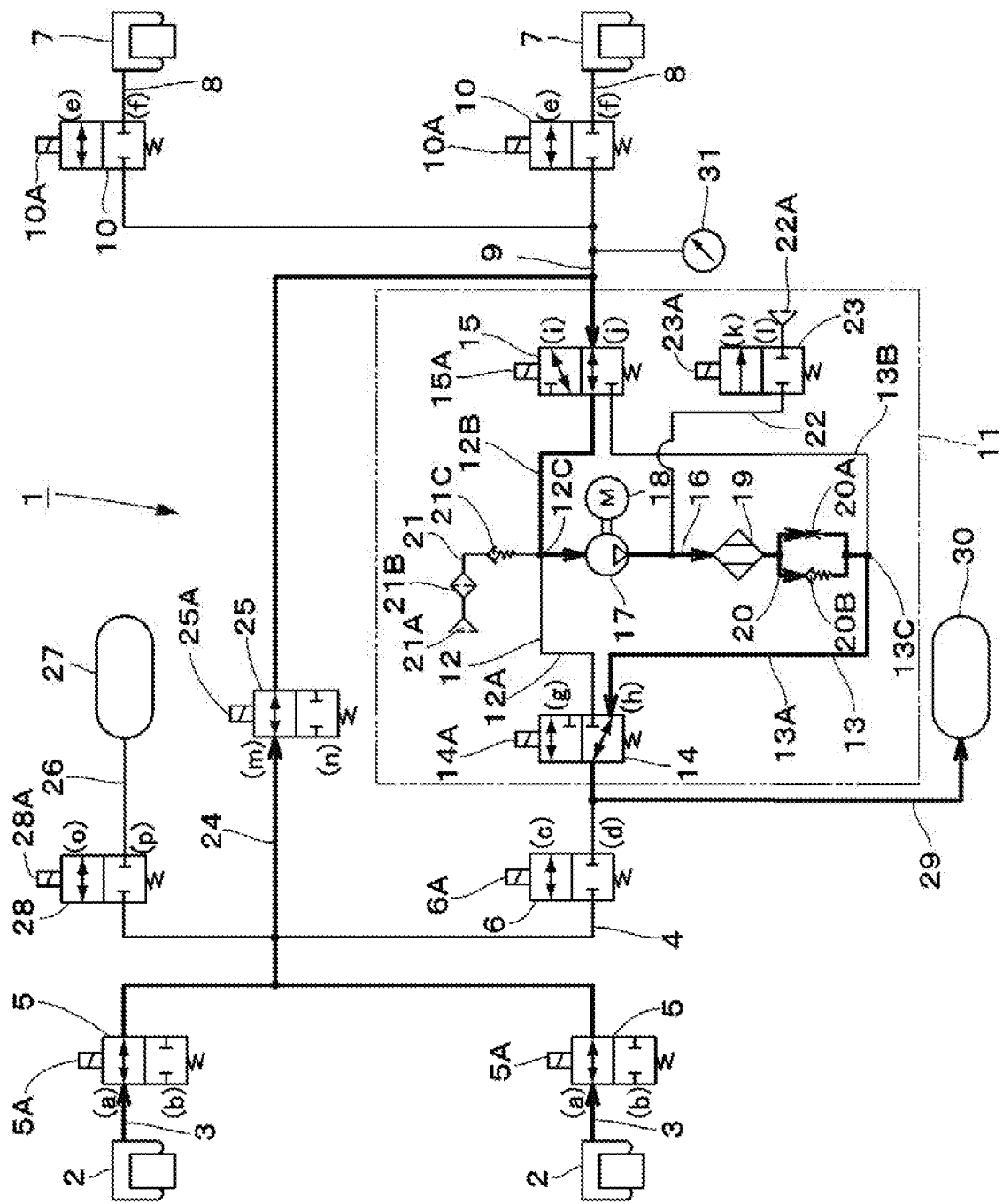
FIG. 5 is a circuit diagram illustrating a flow of the hydraulic fluid when the vehicle height on the front wheel side is lowered.

Next, as illustrated in FIG. 5, when lowering only the vehicle height on the front wheel side, the air suspension system 1 switches the front-side supply/discharge valves 5 and the bypass valve 25 to the open positions (a) and (m), respectively, and holds the front-side switching valve 6, the rear-side supply/discharge valves 10, and the first tank valve 28 at the closed positions (d), (f), and (p), respectively. Further, the air suspension system 1 holds the first switching valve 14 and the second switching valve 15 at the non-power supply positions (h) and (j), respectively. When the air suspension system 1 starts to operate the compressor 17 in this state, the compressed air in the front wheel-side suspensions 2 flows toward the intake side of the compressor 17 via the front-side branch conduits 3, the front-side supply/discharge passage 4, the bypass conduit 24, the rear-side supply/discharge passage 9, the rear-side first airflow conduit 12B, and the main conduit 16. Then, the air suspension system 1 sucks the compressed air in the front wheel-side suspensions 2 by the compressor 17 while supplying this compressed air toward the second tank 30 via the main conduit 16, the front-side second airflow conduit 13A, the front-side supply/discharge passage 4, and the second tank conduit 29. As a result, the air suspension system 1 discharges the compressed air from the front wheel-side suspensions 2 to thus shift the front wheel-side suspensions 2 to the compressed state, thereby being able to lower the vehicle height.

On the other hand, as illustrated in FIG. 6, when lowering only the vehicle height on the rear wheel side, the air suspension system 1 switches the rear-side supply/discharge valves 10 to the open positions (e), and holds the front-side supply/discharge valves 5, the front-side switching valve 6, the bypass valve 25, and the first tank valve 28 at the closed positions (b), (d), (n), and (p), respectively. Further, the air suspension system 1 holds the first switching valve 14 and the second switching valve 15 at the non-power supply positions (h) and (j), respectively. When the air suspension system 1 starts to operate the compressor 17 in this state, the compressed air in the rear wheel-side suspensions 7 flows toward the intake side of the compressor 17 via the rear-side branch conduits 8, the rear-side supply/discharge passage 9, the rear-side first airflow conduit 12B, and the main conduit 16. Then, the air suspension system 1 increases the pressure of the compressed air in the rear wheel-side suspensions 7 by the compressor 17, and supplies this compressed air toward the second tank 30 via the main conduit 16, the front-side second airflow conduit 13A, the front-side supply/discharge passage 4, and the second tank conduit 29. As a result, the air suspension system 1 discharges the compressed air from the rear wheel-side suspensions 7 to thus shift the rear wheel-side suspensions 7 to the compressed state, thereby being able to lower the vehicle height.

Figure 7:
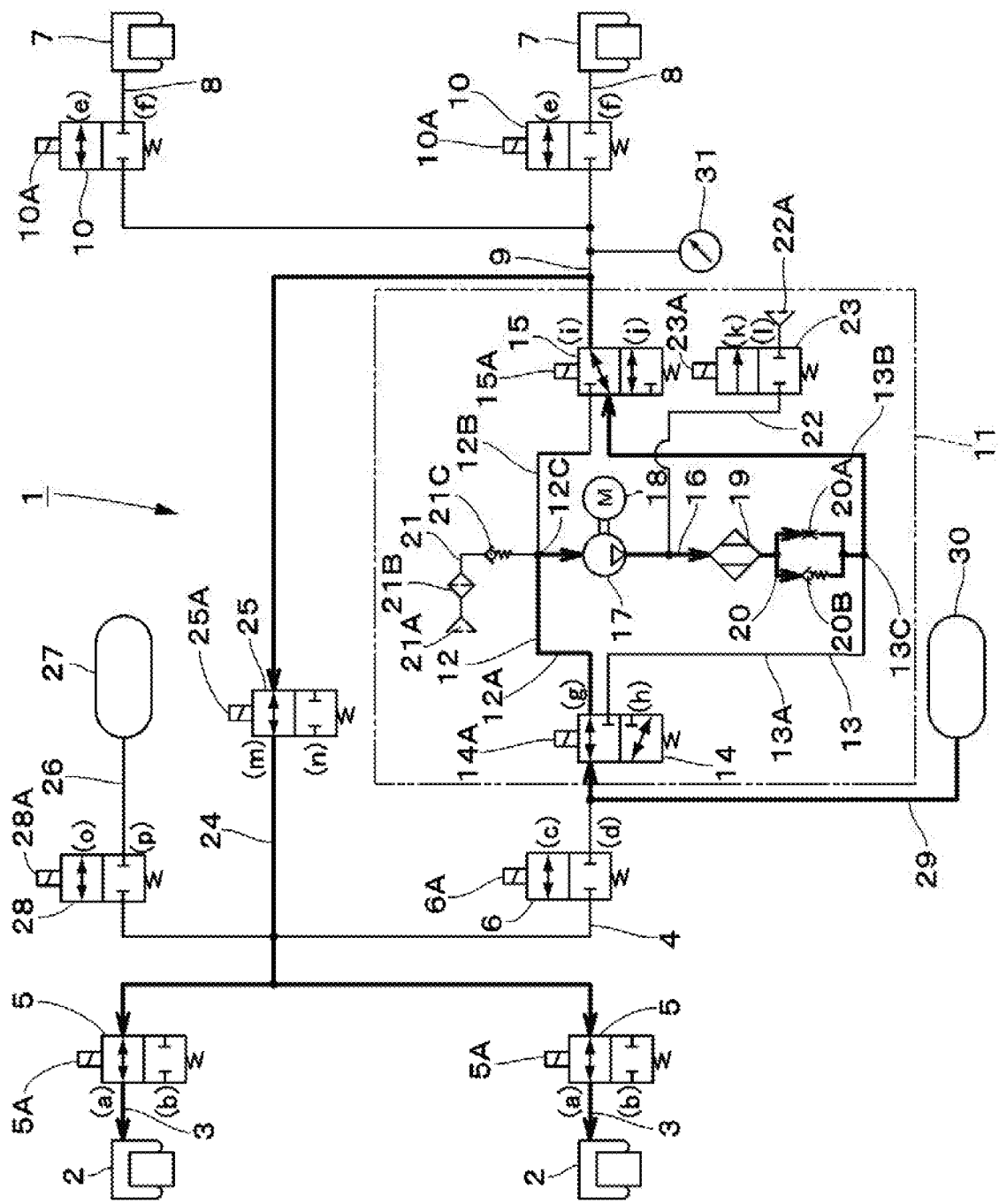
FIG. 7 is a circuit diagram illustrating a flow of the hydraulic fluid when the vehicle height on the front wheel side is raised.

Next, as illustrated in FIG. 7, when raising only the vehicle height on the front wheel side by the front wheel-side suspensions 2, the air suspension system 1 switches the front-side supply/discharge valves 5 and the bypass valve 25 from the closed positions (b) and (n) to the open positions (a) and (m), respectively. Further, the air suspension system 1 holds the front-side switching valve 6, the rear-side supply/discharge valves 10, and the first tank valve 28 at the closed positions (d), (f), and (p), respectively. Further, the air suspension system 1 switches the first switching valve 14 and the second switching valve 15 from the non-power supply positions (h) and (j) to the power supply positions (g) and (i), respectively, thereby establishing the communication between the second tank 30 and the intake side of the compressor 17 and between the discharge side of the compressor 17 and the front wheel-side suspensions 2. The air suspension system 1 actuates the compressor 17 in this state, thereby causing the compressed air in the second tank 30 to flow toward the intake side of the compressor 17 via the second tank conduit 29, the front-side supply/discharge passage 4, the front-side first airflow conduit 12A, and the main conduit 16. Then, the air suspension system 1 supplies the compressed air in the second tank 30 toward the front wheel-side suspensions 2 via the main conduit 16, the rear-side second airflow conduit 13B, the rear-side supply/discharge passage 9, the bypass conduit 24, the front-side supply/discharge passage 4, and the rear-side branch conduits 3 by the compressor 17.

On the other hand, as illustrated in FIG. 8, when raising only the vehicle height on the rear wheel side by the rear wheel-side suspensions 7, the air suspension system 1 switches the rear-side supply/discharge valves 10 from the closed positions (f) to the open positions (e). Further, the air suspension system 1 holds the front-side supply/discharge valves 5, the front-side switching valve 6, the bypass valve 25, and the first tank valve 28 at the closed positions (b), (d), (n), and (p), respectively. Further, the air suspension system 1 holds the first switching valve 14 and the second switching valve 15 at the non-power supply positions (h) and (j), respectively, thereby establishing the communication between the second tank 30 and the intake side of the compressor 17 and between the discharge side of the compressor 17 and the rear wheel-side suspensions 7. The air suspension system 1 actuates the compressor 17 in this state, thereby causing the compressed air in the second tank 30 to flow toward the intake side of the compressor 17 via the second tank conduit 29, the front-side supply/discharge passage 4, the front-side first airflow conduit 12A, and the main conduit 16. In other words, the air suspension system 1 supplies the compressed air in the second tank 30 toward the rear wheel-side suspensions 7 via the main conduit 16, the rear-side second airflow conduit 13B, the rear-side supply/discharge passage 9, and the rear-side branch conduits 8 by the compressor 17.

Figure 9:
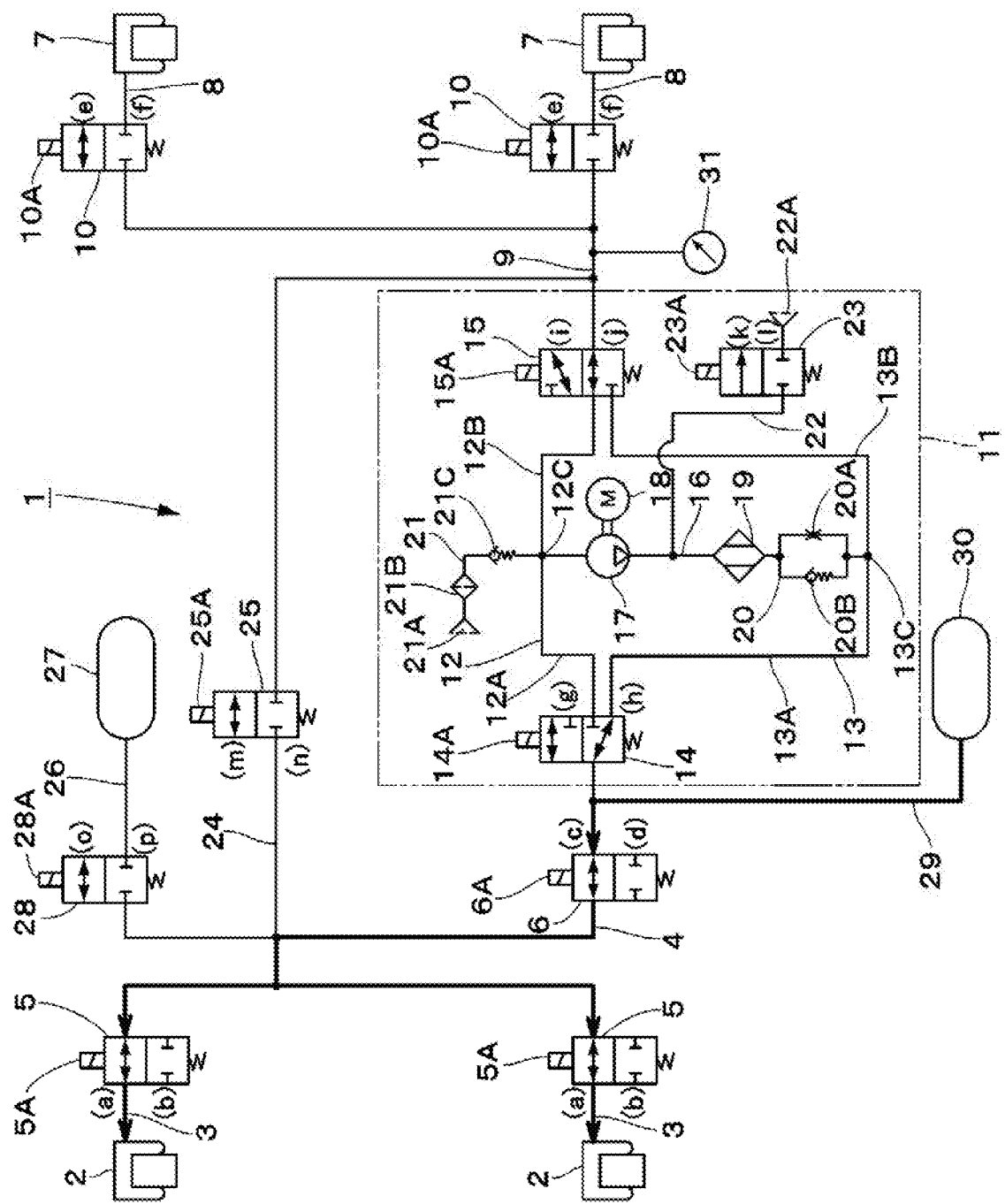
FIG. 9 is a circuit diagram illustrating a flow of the hydraulic fluid when the vehicle height on the front wheel side is raised without use of a pressurization device.

Next, as illustrated in FIG. 9, when raising only the vehicle height on the front wheel side by the compressed air in the second tank 30, the air suspension system 1 switches the front-side supply/discharge valves 5 and the front-side switching valve 6 to the open positions (a) and (c), respectively, and holds the rear-side supply/discharge valves 10, the bypass valve 25, and the first tank valve 28 at the closed positions (f), (n), and (p), respectively. Further, the air suspension system 1 holds the first switching valve 14 and the second switching valve 15 at the non-power supply positions (h) and (j), respectively. Due to this operation, the air suspension system 1 can supply the compressed air in the second tank 30 only to the front wheel-side suspensions 2 via the second tank conduit 29, the front-side supply/discharge passage 4, and the front-side branch conduits 3.

Figure 10:
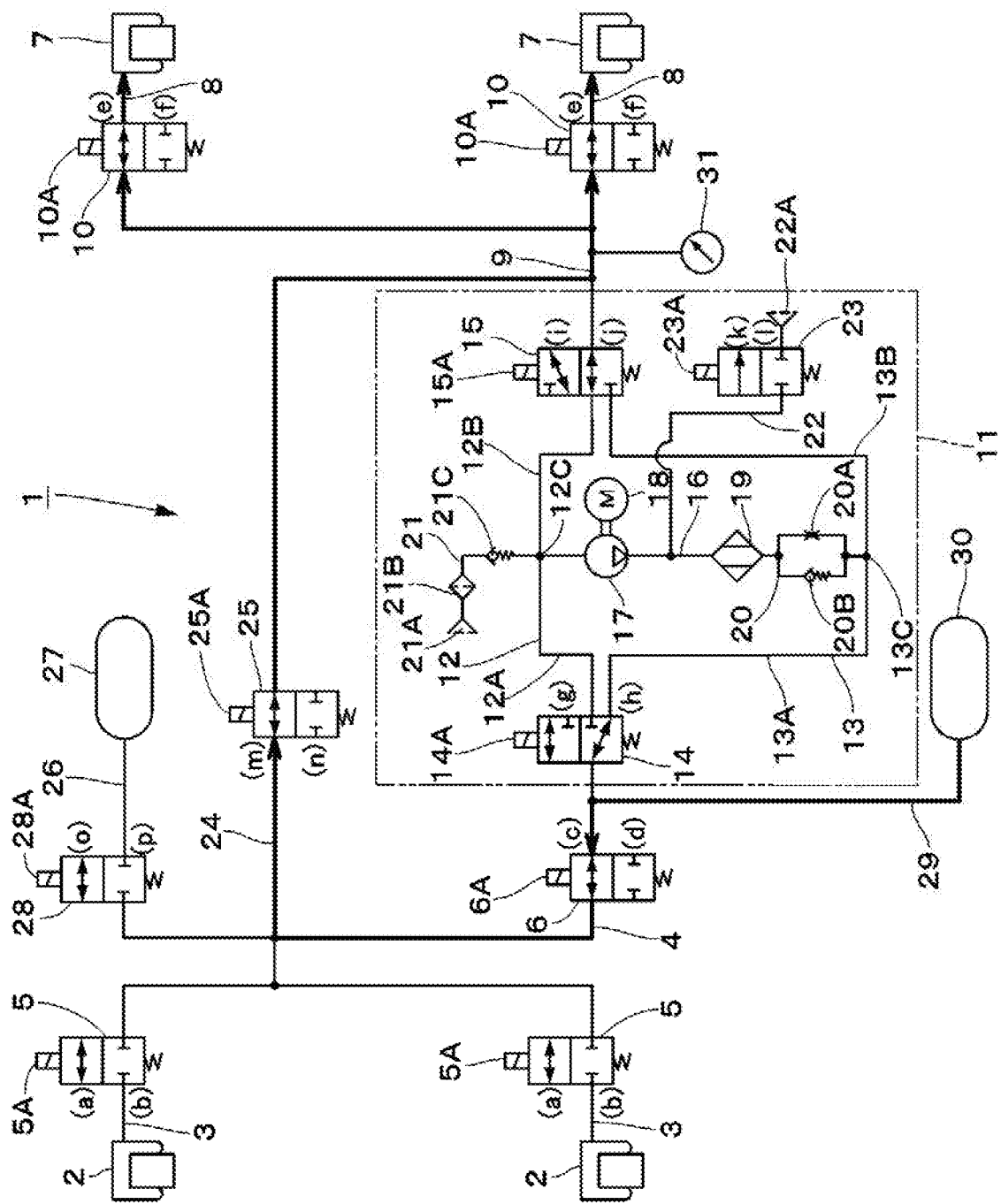
FIG. 10 is a circuit diagram illustrating a flow of the hydraulic fluid when the vehicle height on the rear wheel side is raised without use of the pressurization device.

Next, as illustrated in FIG. 10, when raising only the vehicle height on the rear wheel side by the compressed air in the second tank 30, the air suspension system 1 switches the front-side switching valve 6, the rear-side supply/discharge valves 10, and the bypass valve 25 to the open positions (c), (e), and (m), respectively, and holds the front-side supply/discharge valves 5 and the first tank valve 28 at the closed positions (b) and (p), respectively. Further, the air suspension system 1 holds the first switching valve 14 and the second switching valve 15 at the non-power supply positions (h) and (j), respectively. Due to this operation, the air suspension system 1 can supply the compressed air in the second tank 30 only to the rear wheel-side suspensions 7 via the second tank conduit 29, the front-side supply/discharge passage 4, the bypass conduit 24, the rear-side supply/discharge passage 9, and the rear-side branch conduits 8.

Figure 11:
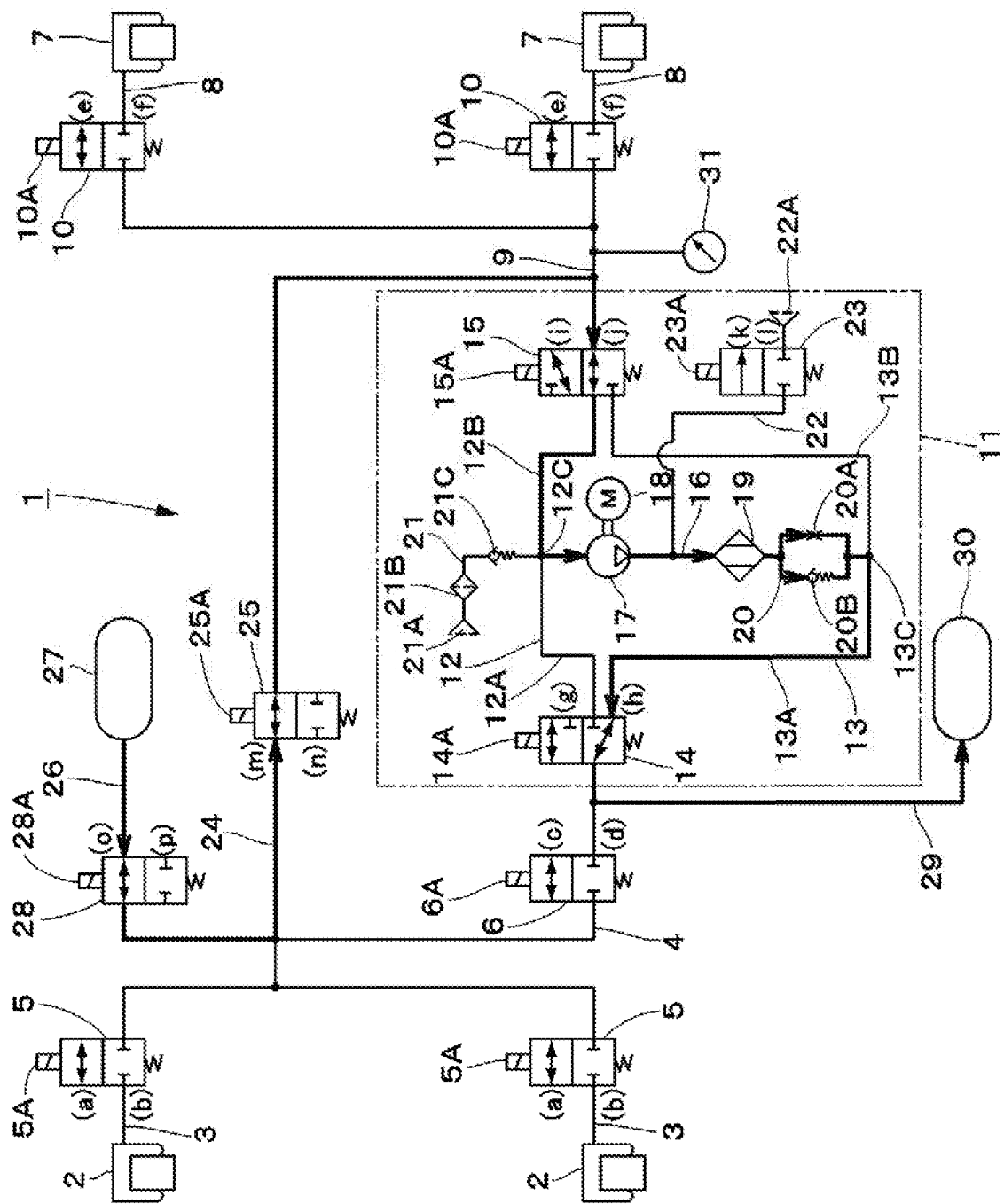
FIG. 11 is a circuit diagram illustrating a flow of the hydraulic fluid when the hydraulic fluid is supplied from a first tank toward a second tank.

Next, as illustrated in FIG. 11, when supplying (transferring) the compressed air in the first tank 27 to the second tank 30 to adjust the pressure, the air suspension system 1 switches the bypass valve 25 and the first tank valve 28 from the closed positions (n) and (p) to the open positions (m) and (o), respectively. Further, the air suspension system 1 holds the front-side supply/discharge valves 5, the front-side switching valve 6, and the rear-side supply/discharge valves 10, and the first switching valve 14 and the second switching valve 15 at the closed positions (b), (d), and (f), and the non-power supply positions (h) and (j), respectively. Due to this operation, the air suspension system 1 establishes the communication between the first tank 27 and the intake side of the compressor 17 and between the discharge side of the compressor 17 and the second tank 30. By actuating the compressor 17 in this state, the air suspension system 1 causes the compressed air in the first tank 27 to flow to the intake side of the compressor 17 via the first tank conduit 26, the bypass conduit 24, the rear-side supply/discharge passage 9, the rear-side first airflow conduit 12B, and the main conduit 16. In other words, the air suspension system 1 supplies the compressed air in the first tank 27 toward the second tank 30 via the main conduit 16, the front-side second airflow conduit 13A, the front-side supply/discharge passage 4, and the second tank conduit 29 by the compressor 17. Due to this operation, the air suspension system 1 can transfer the compressed air in the first tank 27 to the second tank 30, thereby keeping the first tank 27 in the low-pressure state.

Next, when discharging the compressed air in the second tank 30 outward, the air suspension system 1 holds the front-side supply/discharge valves 5, the front-side switching valve 6, the rear-side supply/discharge valves 10, the bypass valve 25, and the first tank valve 28 at the closed positions (b), (d), (f), (n), and (p), respectively, and switches the exhaust valve 23 to the open position (k). Further, the air suspension system 1 holds the first switching valve 14 and the second switching valve 15 at the non-power supply positions (h) and (j), respectively. Due to this operation, the air suspension system 1 can directly exhaust the compressed air in the second tank 30 outward from the exhaust port 22A via the second tank conduit 29, the front-side supply/discharge passage 4, the front-side second airflow conduit 13A, the main conduit 16, the orifice 20A of the speed control valve 20, the air drier 19, and the exhaust conduit 22. In this case, the air suspension system 1 allows the compressed air discharged from the second tank 30 to flow to the exhaust conduit 22 via the air drier 19, thereby allowing the moisture to be removed from the desiccant loaded in the air drier 19, thus regenerating the desiccant.

In this manner, according to the air suspension system 1 of the first embodiment, the front wheel-side suspensions 2 are configured to discharge the compressed air to the first tank 27, and the rear wheel-side suspensions 7 are configured to discharge the compressed air into the second tank 30 by the compression device 11, when lowering the vehicle height by each of the suspensions 2 and 7. Due to this configuration, the air suspension system 1 can adjust the vehicle height in a short time.

In other words, the air suspension system 1 is configured in such a manner that the front wheel-side suspensions 2 and the rear wheel-side suspensions 7 discharge the compressed air to the different tanks, respectively, when lowering the vehicle heights. Due to this configuration, the air suspension system 1 can separate the compressed air discharged from the front wheel-side suspensions 2 and the compressed air discharged from the rear wheel-side suspensions 7, thereby preventing the compressed air discharged from the front wheel-side suspensions 2 and the compressed air discharged from the rear wheel-side suspensions 7 from interfering each other and thus preventing them from affecting each other.

Therefore, even when the pressures in the front wheel-side suspensions 2 and the pressures in the rear wheel-side suspensions 7 are different from each other, the air suspension system 1 keeps them uninfluential on each other, thereby being able to prevent or reduce a flow of the compressed air from a suspension high in pressure to a suspension low in pressure. As a result, the air suspension system 1 can lower the vehicle height on the front wheel side and the vehicle height on the rear wheel side at the same time, thereby adjusting the vehicle height in a short time.

Further, according to the first embodiment, the first tank 27 is low in pressure therein compared to the second tank 30, and the air suspension system 1 can supply the compressed air in the first tank 27 so as to transfer it to the second tank 30 with use of the compression device 11 in a standby state where the vehicle height adjustment is out of operation as illustrated in FIG. 11. Due to this transfer, the air suspension system 1 can keep the pressure in the first tank 27 in the low-pressures state, thereby preventing or reducing, for example, a slow-down of a speed at which the vehicle height is lowered on the front wheel side. As a result, the air suspension system 1 can adjust the vehicle height in a short time.

Further, according to the first embodiment, the air suspension system 1 is configured to lower the vehicle height on the front wheel side and the vehicle height on the rear wheel side at the same time. As a result, the air suspension system 1 can stabilize a behavior of the vehicle when lowering the vehicle height. More specifically, the air suspension system 1 can reduce a tilt when lowering the vehicle, thereby improving a vehicle appearance performance at the same time as making an angle of a headlight less changeable while the vehicle is running.

Further, according to the first embodiment, the air suspension system 1 is configured in such a manner that the compressed air in the second tank 30 is supplied to the front wheel-side suspensions 2 and the compressed air in the second tank 30 is supplied to the rear wheel-side suspensions 7 after being pressurized by the compression device 11 when raising the vehicle height by each of the suspensions 2 and 7. Due to this configuration, the air suspension system 1 can separate the compressed air to be supplied to the front wheel-side suspensions 2 and the compressed air to be supplied to the rear wheel-side suspensions 7, thereby preventing the compressed air to be supplied to the front wheel-side suspensions 2 and the compressed air to be supplied to the rear wheel-side suspensions 7 from affecting each other. As a result, the air suspension system 1 can raise the vehicle height on the front wheel side and the vehicle height on the rear wheel side at the same time, thereby adjusting the vehicle height in a short time.

Further, the air suspension system 1 forms a closed circuit (a closed system) capable of storing the compressed air compressed by the compressor 17 in the second tank 30 and supplying this compressed air stored in the second tank 30 to each of the suspensions 2 and 7. As a result, the air suspension system 1 is less susceptible to influences of an external temperature, humidity, pressure, and the like, thereby being able to achieve stable suspension control.

Further, the air suspension system 1 can discharge the compressed air in the front wheel-side suspensions 2 into the second tank 30 with use of the compression device 11 when lowering only the vehicle height on the front wheel side. Further, the air suspension system 1 can discharge the compressed air in the rear wheel-side suspensions 7 into the second tank 30 with use of the compression device 11 when lowering only the vehicle height on the rear wheel side. As a result, the air suspension system 1 can lower the vehicle height even without use of the first tank 27, thereby omitting a pressure adjustment between the first tank 27 and the second tank 30.

Further, the air suspension system 1 can supply the compressed air in the second tank 30 to the suspensions 2 and 7 without intervention of the compression device 11 when raising the vehicle height. As a result, the air suspension system 1 can achieve power saving and a noise reduction because not using the electric motor 18.

Figure 12:
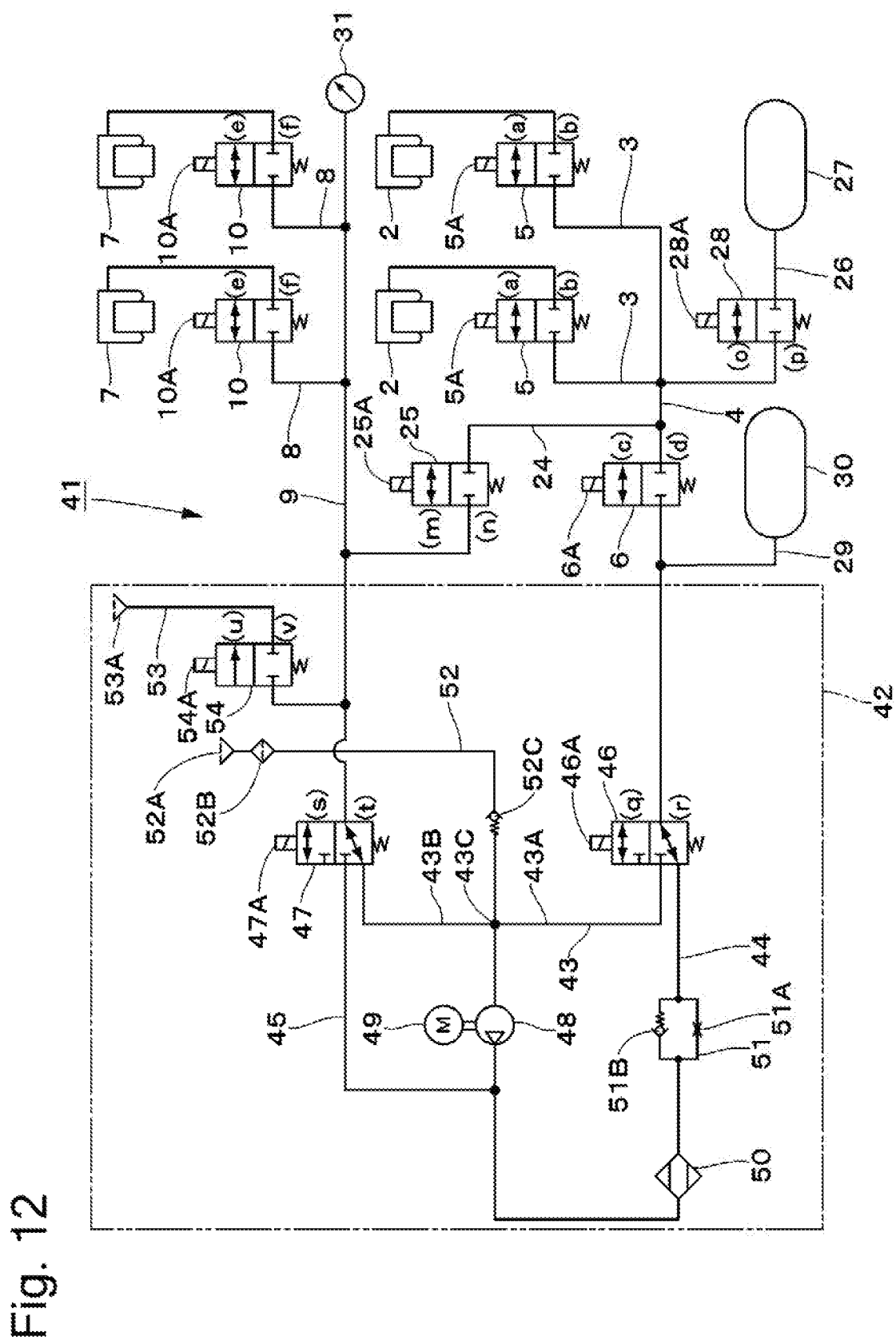
FIG. 12 is a circuit diagram illustrating a configuration of an entire air suspension system according to a second embodiment.

Next, FIG. 12 illustrates a second embodiment of the present invention. The second embodiment is characterized in that a compression device thereof has a circuit configuration changed from the compression device described in the first embodiment. The second embodiment will be described, identifying similar components to the above-described first embodiment by the same reference numerals and omitting descriptions thereof.

In FIG. 12, an air suspension system 41 intended to be mounted on the vehicle includes the front wheel-side suspensions 2, the rear wheel-side suspensions 7, the first tank 27, the second tank 30, the controller 33, and a compression device 42 similarly to the air suspension system 1 according to the first embodiment. However, the air suspension system 41 according to the second embodiment is different from the first embodiment in terms of a circuit configuration of the compression device 42 that is changed from the circuit configuration of the compression device 11 according to the first embodiment.

The compression device 42 as the pressurization device is arranged between the front wheel-side suspensions 2 and the rear wheel-side suspensions 7. More specifically, one end of the compression device 42 is connected to the front-side supply/discharge passage 4, and the other end of the compression device 42 is connected to the rear-side supply/discharge passage 9. As illustrated in FIG. 12, this compression device 42 includes an airflow conduit 43, a main conduit 44, a supply/discharge passage 45, first and second switching valves 46 and 47, a compressor 48, an electric motor 49, an air drier 50, a speed control valve 51, an intake conduit 52, an exchange conduit 53, and the like. This compression device 42 forms, for example, a pneumatic source that supplies the compressed air acquired by compressing the air to the front wheel-side suspensions 2 and the rear wheel-side suspensions 7. The compressor 48, the electric motor 49, the air drier 50, and the speed control valve 51 can be configured similarly to the compressor 17, the electric motor 18, the air drier 19, and the speed control valve 20 described in the first embodiment, respectively.

One side of the airflow conduit 43 is connected to the first switching valve 46, and the other side of the airflow conduit 43 is connected to the second switching valve 47. This airflow conduit 43 is configured to be connected to an intake side of the compressor 48 via the main conduit 44, and also connect the front-side supply/discharge passage 4 and the rear-side supply/discharge passage 9 to each other therebetween. In this case, the airflow conduit 43 includes a front-side airflow conduit 43A and a rear-side airflow conduit 43B. The front-side airflow conduit 43A connects the first switching valve 46 and a connection point 43C with the main conduit 44, which will be described below, to each other therebetween. The rear-side airflow conduit 43B connects the connection point 43C with the main conduit 44 and the second switching valve 47 to each other therebetween.

Now, the first switching valve 46, which will be described below, is connected to one side of the front-side airflow conduit 43A. This front-side first airflow conduit 43A forms, for example, an airflow passage that guides the compressed air in the second tank 30 to the intake side of the compressor 48 when communication is established between the rear wheel-side suspensions 7 and the compressor 48. Further, the second switching valve 47, which will be described below, is provided in the rear-side airflow conduit 43B. This rear-side airflow conduit 43B forms an airflow passage that connects the rear wheel-side suspensions 7 to the intake side of the compressor 48 via the second switching valve 47 and the like.

The main conduit 44 connects the airflow conduit 43 and the first switching valve 46 to each other therebetween. More specifically, an end portion of the main conduit 44 on an upstream side is connected to the connection point 43C with the airflow conduit 43 (to between the front-side airflow conduit 43A and the rear-side airflow conduit 43B), and an end portion of the main conduit 44 on a downstream side is connected to the first switching valve 46. The main conduit 44 forms a supply/discharge conduit that supplies and discharges the compressed air to and from each of the suspensions 2 and 7. The compressor 48, the air drier 50, and the speed control valve 51 are provided in the main conduit 44.

The supply/discharge passage 45 is provided at a position between the main conduit 44 and the second switching valve 47. More specifically, one side of the supply/discharge passage 45 is connected to the main conduit 44, and the other side of the supply/discharge passage 45 is connected to the second switching valve 47. This supply/discharge passage 45 is configured to connect the compressor 48 and the second switching valve 47 to each other therebetween.

The first switching valve 46 is provided on the one side of the front-side airflow conduit 43A at a position between the front-side switching valve 6 and the intake side or the discharge side of the compressor 48. The first switching valve 46 is constructed with use of, for example, a three-port two-position electromagnetic directional control valve equipped with a solenoid 46A, and switching thereof is controlled by the controller 33, to selectively connect the front-side supply/discharge passage 4 to the intake side (the airflow conduit 43) or the discharge side (the main conduit 44) of the compressor 48.

Now, the first switching valve 46 is selectively switched to a power supply position (q) and a non-power supply position (r) due to power supply from the controller 33 to the solenoid 46A. At the power supply position (q), the first switching valve 46 permits the compressed air in the second tank 30 to be supplied to and discharged from the rear wheel-side suspensions 7 via the front-side airflow conduit 43A and the main conduit 44, and the supply/discharge passage 45. At the non-power supply position (r), the first switching valve 46 permits the compressed air in each of the suspensions 2 and 7 to be supplied (transmitted) into the second tank 30 via the main conduit 44 and the front-side airflow conduit 43A. In other words, the first switching valve 46 is a switching valve that changes the direction in which the compressed air flows.

The second switching valve 47 is provided on the other side of the rear-side airflow conduit 43B at a position between the rear-side supply/discharge valves 10 and the intake side or the discharge side of the compressor 48. The second switching valve 47 is constructed with use of, for example, a three-port two-position electromagnetic directional control valve equipped with a solenoid 47A, and switching thereof is controlled by the controller 33, to selectively connect the airflow conduit 43 or the supply/discharge passage 45 to the rear-side supply/discharge passage 9.

Now, the second switching valve 47 is selectively switched to a power supply position (s) and a non-power supply position (t) due to power supply from the controller 33 to the solenoid 47A. At the power supply position (s), the second switching valve 47 permits the compressed air in the second tank 30 to be supplied to and discharged from the rear wheel-side suspensions 7 via the front-side airflow conduit 43A, the main conduit 44, and the supply/discharge passage 45. At the non-power supply position (t), the second switching valve 47 permits the compressed air in each of the suspensions 2 and 7 to be supplied (transmitted) into the second tank 30 via the rear-side airflow conduit 43B, the main conduit 44, and the front-side supply/discharge passage 4.

The compressor 48 is positioned in the main conduit 44, and is formed by for example, a reciprocating compressor, a scroll-type compressor, or the like. The compressor 48 is drive by the electric motor 49 serving as the driving source, and generates the compressed air by compressing the air introduced from the airflow conduit 43 side or the intake conduit 52 side to supply this compressed air toward the air drier 50.

The air drier 50 is provided between the compressor 48 and the speed control valve 51 at a position in the main conduit 44. This air drier 50 includes a moisture absorbent and the like built therein, and absorbs moisture by the internal moisture absorbent when the compressed air supplied from the compressor 48 flows in a forward direction toward the speed control valve 51. On the other hand, the compressed air flowing in a backward direction from each of the suspensions 2 and 7 or the second tank 30 toward the exhaust conduit 53, which will be described below, flows backward in the air drier 50, thereby capturing the moisture absorbed by the moisture absorbent and thus regenerating this moisture absorbent.

The speed control valve 51 is provided between the air drier 50 and the first switching valve 46 at a position in the main conduit 44. This speed control valve 51 is formed by a parallel circuit including an orifice 51A and a check valve 51B, and is configured in the following manner. With respect to the flow in the forward direction, the check valve 51B is opened and the compressed air is not subjected to a reduction in a flow rate. However, with respect to the flow in the backward direction, the check valve 51B is closed, and the compressed air at this time is subjected to the reduction in the flow rate due to the orifice 51A, thereby flowing backward slowly at a small flow rate inside the air drier 50.

The intake conduit 52 is provided at an upstream position of the intake side of the compressor 48. More specifically, one side of the intake conduit 52 is in communication with outside via an intake port 52A, and the other end of the intake conduit 52 is connected to the airflow conduit 43. This intake conduit 52 functions to supply the outside air or the atmosphere introduced from the intake port 52A due to actuation of the compressor 48 toward the compressor 48 via a filter 52B. A check valve 52C is provided between the connection point 43C and the filter 52B in the intake conduit

52. The check valve 52C prevents a backward flow of the air introduced from the intake port 52A.

The exhaust conduit 53 is provided so as to branch off from between the rear-side supply/discharge valves 10 and the second switching valve 47. More specifically, one side of the exhaust conduit 53 is connected to the rear-side supply/discharge passage 9, and the other side of the exhaust conduit 53 is in communication with outside via an exhaust port 53A. This exhaust conduit 53 is a conduit for exhausting the compressed air in each of the suspensions 2 and 7 and the tanks 27 and 30 into the external atmosphere. An exhaust valve 54 is provided at an intermediate position of the exhaust conduit 53.

The exhaust valve 54 is a valve that establishes and blocks communication of the exhaust conduit 53 connected to the main conduit 44 with the atmosphere. This exhaust valve 54 is constructed with use of a two-port two-position normally-closed electromagnetic valve equipped with a solenoid 54A, and switching thereof is controlled by the controller 33. The exhaust valve 54 is selectively switched to an open position (u) and a closed position (v) due to power supply from the controller 33 to the solenoid 54A. At the open position (u), the exhaust valve 54 opens the exhaust conduit 53, thereby permitting the compressed air to be exhausted from the exhaust port 53A. At the closed position (v), the exhaust valve 54 closes the exhaust conduit 53, thereby prohibiting the compressed air from being exhausted from the exhaust port 53A. More specifically, the exhaust valve 54 is normally closed to block the communication of the exhaust conduit 53 with the exhaust port 53A. Then, when being opened, the exhaust valve 54 establishes the communication of the exhaust conduit 53 with the exhaust port 53A, thereby exhausting (releasing) the compressed air in the exhaust conduit 53 into the atmosphere.

In this manner, according to the second embodiment, the air suspension system 41 can acquire substantially similar advantageous effects to the first embodiment. In the second embodiment, the first switching valve 46 is connected to the front-side airflow conduit 43A and the main conduit 44. Further, the second switching valve 47 is connected to the rear-side airflow conduit 43B and the supply/discharge passage 45. As a result, the air suspension system 41 can raise and lower the vehicle height on the front wheel side and the vehicle height on the rear wheel side at the same time, thereby adjusting the vehicle height in a short time.

In the first embodiment, the air suspension system 1 is configured in such a manner that the front wheel-side suspensions 2 discharge the compressed air to the first tank 27, and the rear wheel-side suspensions 7 discharge the compressed air into the second tank 30 with use of the compression device 11, when lowering the vehicle height. However, the present invention is not limited thereto, and the air suspension system may be configured in such a manner that the front wheel-side suspension discharges the compressed air into the second tank 30 with use of the compression device and the rear wheel-side suspension discharges the compressed air to the first tank 27. The same also applies to the second embodiment.

Further, in the first embodiment, the air suspension system 1 is configured in such a manner that the compressed air in the second tank 30 is supplied to the front wheel-side suspensions 2, and the compressed air is supplied to the rear wheel-side suspensions 7 after the pressure thereof is increased with use of the compression device 11. However, the present invention is not limited thereto, and the air suspension system may be configured in such a manner that the compressed air is supplied to the front wheel-side suspension after the pressure thereof is increased with use of the compressor and the compressed air in the tank is supplied to the rear wheel-side suspension. The same also applies to the second embodiment.

Further, in the above-described first embodiment, the compression device 11 is configured to include one compressor 17. However, the present invention is not limited thereto, and the compression device may be configured to include two or more compressors. The same also applies to the second embodiment.

Further, in each of the embodiments, the air suspension system has been described assuming that the compressed air is used as the hydraulic fluid by way of example. However, the present invention is not limited thereto, and the air suspension system may be configured to use liquid such as water containing oil liquid and an additive mixed therein as the hydraulic fluid. In this case, the above-described effects can also be achieved by configuring the air suspension system to employ a hydraulic pump or the like instead of the compressor and also omitting the air drier.

Possible configurations as a suspension system based on the above-described embodiments include the following examples.

As one configuration of the suspension system, the suspension system includes a front wheel-side suspension and a rear wheel-side suspension each provided between a vehicle body and an axle and configured to adjust a vehicle height according to supply and discharge of hydraulic fluid, a pressurization device configured to pressurize the hydraulic fluid, and a first tank and a second tank configured to store therein the hydraulic fluid pressurized by this pressurization device. When the suspension system lowers the vehicle height by each of the front wheel-side suspension and the rear wheel-side suspension, any one of the front wheel-side suspension and the rear wheel-side suspension discharges the hydraulic fluid to the first tank, and the other of the front wheel-side suspension and the rear wheel-side suspension discharges the hydraulic fluid into the second tank by the pressurization device.

As a second configuration, in the first configuration, the suspension system is configured to supply the hydraulic fluid in the first tank to the second tank with use of the pressurization device.

As a third configuration, in the first configuration or the second configuration, the suspension system lowers the vehicle height on the front wheel side and the vehicle height on the rear wheel side at the same time.

As a fourth configuration, in any of the first to third configurations, when the suspension system raises the vehicle height by each of the front wheel-side suspension and the rear wheel-side suspension, the hydraulic fluid in the second tank is supplied to any one of the front wheel-side suspension and the rear wheel-side suspension, and the hydraulic fluid in the second tank is supplied to the other of the front wheel-side suspension and the rear wheel-side suspension after being pressurized by the pressurization device.

As a fifth configuration, in the fourth configuration, the suspension system raises the vehicle height on the front wheel side and the vehicle height on the rear wheel side at the same time.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2017-012304 filed on Jan. 26, 2017. The entire disclosure of Japanese Patent Application No. 2017-012304 filed on Jan. 26, 2017 including the specification, the claims, the drawings, and the abstract is incorporated herein by reference in its entirety.

REFERENCE SIGN LIST 1, 41 air suspension system (suspension system)
2 front wheel-side suspension
7 rear wheel-side suspension
11, 42 compression device (pressurization device)
14, 46 first switching valve
15, 47 second switching valve
17, 48 compressor
18, 49 electric motor
19, 50 air drier
24 bypass conduit
25 bypass valve
27 first tank
30 second tank

The invention claimed is:

1. A suspension system comprising:
 a front wheel-side suspension and a rear wheel-side suspension each provided between a vehicle body and an axle and configured to adjust a vehicle height according to supply and discharge of hydraulic fluid;
 a pressurization device configured to pressurize the hydraulic fluid; and
 a first tank and a second tank configured to store therein the hydraulic fluid pressurized by this pressurization device,
 wherein, when the vehicle height is lowered by each of the front wheel-side suspension and the rear wheel-side suspension, any one of the front wheel-side suspension and the rear wheel-side suspension discharges the hydraulic fluid to the first tank, and the other of the front wheel-side suspension and the rear wheel-side suspension discharges the hydraulic fluid into the second tank by the pressurization device.

2. The suspension system according to claim 1, wherein the suspension system is configured to supply the hydraulic fluid in the first tank to the second tank with use of the pressurization device.

3. The suspension system according to claim 1, wherein the suspension system lowers the vehicle height on the front wheel side and the vehicle height on the rear wheel side at the same time.

4. The suspension system according to claim 1, wherein, when the vehicle height is raised by each of the front wheel-side suspension and the rear wheel-side suspension, the hydraulic fluid in the second tank is supplied to any one of the front wheel-side suspension and the rear wheel-side suspension, and the hydraulic fluid in the second tank is supplied to the other of the front wheel-side suspension and the rear wheel-side suspension after being pressurized by the pressurization device.

5. The suspension system according to claim 4, wherein the suspension system raises the vehicle height on the front wheel side and the vehicle height on the rear wheel side at the same time.

6. The suspension system according to claim 2, wherein the suspension system lowers the vehicle height on the front wheel side and the vehicle height on the rear wheel side at the same time.

* * * * *